US012528564B2

(12) United States Patent
Lammers-Meis et al.

(10) Patent No.: US 12,528,564 B2
(45) Date of Patent: Jan. 20, 2026

(54) MARINE VESSEL CONTROL SYSTEM FOR A SHALLOW WATER ANCHOR

(71) Applicant: Garmin Switzerland GmbH, Schaffhausen (CH)

(72) Inventors: David F. Lammers-Meis, Overland Park, KS (US); Gregory M. Groener, Overland Park, KS (US); Ravinder Singh, Olathe, KS (US); Jarrod W. Seymour, Overland Park, KS (US)

(73) Assignee: Garmin Switzerland GmbH (CH)

( * ) Notice: Subject to any disclaimer, the term of this patent is extended or adjusted under 35 U.S.C. 154(b) by 433 days.

(21) Appl. No.: 17/820,071

(22) Filed: Aug. 16, 2022

(65) Prior Publication Data

US 2023/0059445 A1 Feb. 23, 2023

Related U.S. Application Data

(60) Provisional application No. 63/263,723, filed on Nov. 8, 2021, provisional application No. 63/234,103, filed on Aug. 17, 2021.

(51) Int. Cl.

| | |
|---|---|
| ***B63B 79/15*** | (2020.01) |
| ***B63B 79/40*** | (2020.01) |
| ***B63H 21/21*** | (2006.01) |
| ***G05D 1/00*** | (2006.01) |

(52) U.S. Cl.

CPC .............. *B63B 79/40* (2020.01); *B63B 79/15* (2020.01); *B63H 21/21* (2013.01); *G05D 1/0206* (2013.01); *B63H 2021/216* (2013.01)

(58) Field of Classification Search

CPC ..... B63B 21/38; B63B 2201/18; B63B 34/05; B63B 49/00; B63B 79/15; B63B 79/40; B63H 2021/216; B63H 21/21

See application file for complete search history.

(56) References Cited

U.S. PATENT DOCUMENTS

| | | | | |
|---|---|---|---|---|
| 11,009,880 | B2 | 5/2021 | Miller et al. | |
| 2021/0371074 | A1 | 12/2021 | Lammers-Meis | |
| 2021/0389765 | A1 | 12/2021 | Behrendt et al. | |
| 2022/0268585 | A1 * | 8/2022 | Tulgara | B63B 79/15 |

OTHER PUBLICATIONS i-Pilot Link Owners Manual, published prior to Aug. 16, 2022.
Minn Kota Raptor Manual, published prior to Aug. 16, 2022.

* cited by examiner

*Primary Examiner* — Charles J Han
(74) *Attorney, Agent, or Firm* — Samuel M. Korte; Max M. Ali; Kathleen D. Fitterling

(57) ABSTRACT

A marine vessel control system operable to be used with a shallow water anchor and a motor. The marine vessel control system comprising a memory and a processor. The processor is configured to receive a user command to maintain a position of a marine vessel, receive sonar data, determine a water depth relative to a water bottom based on the sonar data in response to receiving the user command, and transmit a command to use the shallow water anchor and/or the motor based on the water depth.

12 Claims, 17 Drawing Sheets

MARINE VESSEL CONTROL SYSTEM FOR A SHALLOW WATER ANCHOR

RELATED APPLICATIONS

The current patent application is a regular utility patent application which itself claims priority benefit, with regard to all common subject matter, of earlier-filed U.S. Provisional Application entitled "SHALLOW WATER ANCHOR SYSTEM", Ser. No. 63/263,723, filed Nov. 8, 2021, and earlier-filed U.S. Provisional Application entitled "SHALLOW WATER ANCHOR SYSTEM", Ser. No. 63/234,103, filed Aug. 17, 2021. Each of the above-referenced applications are hereby incorporated by reference, in their entirety, into the current patent application.

BACKGROUND

A marine vessel (e.g., boat, ship, sailboat, or other watercraft) is often used with a marine vessel control system. The marine vessel control system can be used for navigating the marine vessel through water. The marine vessel can employ one or more motors to navigate the marine vessel through the water and/or one or more anchors to maintain a position of the marine vessel. Shallow water anchors, that are mechanically deployed to hold the marine vessel in place, are often used to easily anchor a vessel in shallow water without requiring the deployment of traditional cable or rope anchors. Boaters must often manage the use of main (outboard) motors, trolling motors, and anchors to position a vessel.

BRIEF DESCRIPTION OF THE DRAWINGS

The detailed description references the accompanying figures. The use of the same reference numbers in different instances in the description and the figures may indicate similar or identical items. In addition, the proportion and the relative scale of the elements provided in the figures are intended to illustrate various embodiments of the present disclosure and are not to be used in a limiting sense.

DETAILED DESCRIPTION

Figure 1:
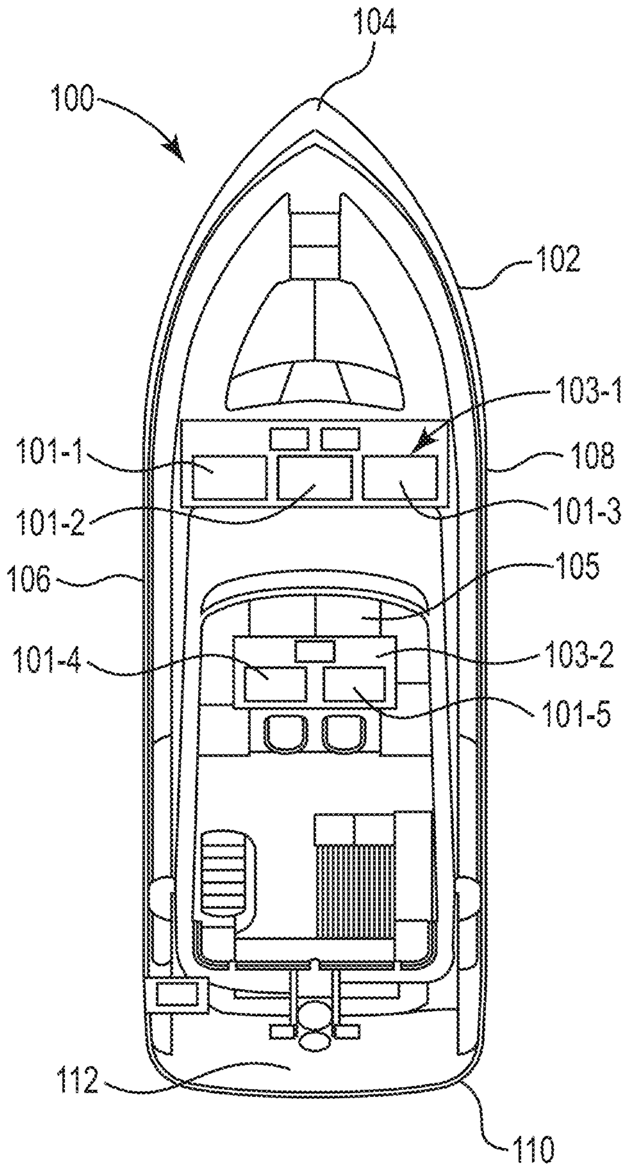
FIG. 1 is a top view of a marine vessel that can employ a marine vessel control system.

A marine vessel (e.g., a boat) employs one or more motors to navigate the marine vessel through the water. For example, the marine vessel includes a primary motor (e.g., an outboard propulsion motor) that propels the marine vessel through the water. The marine vessel can further include at least one secondary motor (e.g., a trolling motor and/or thruster) that can be used instead of or in addition to the propulsion motor. For example, a trolling motor may be used instead of the propulsion motor when navigating the marine vessel through environments that require precision (e.g., navigating around obstacles and/or in shallow water). Either motor can follow a route for the user and the trolling motor can maintain the vessel at a fixed (or substantially fixed) position in the water to provide virtual "anchor" functionality. A shallow water anchor may be used to hold the position of the vessel in the water once it arrives at its desired destination.

The present disclosure includes a marine vessel control system operable to be used with a shallow water anchor and/or a motor. The marine vessel control system can include a memory and a processor. The processor can be configured to receive a user command to maintain a position of a marine vessel, receive sonar data, determine a water depth relative to a water bottom based on the sonar data, and transmit a command to use the shallow water anchor and/or the motor based on the water depth.

Such functionality assists the user in easily controlling the vessel by ensuring that the components of the vessel—such as the trolling motor and shallow water anchor—are properly utilized based on the environment of the vessel. For example, in shallow water, the control system may determine based on the depth of the water that the shallow water anchor should be deployed to hold the position of vessel. In deeper water, the control system may determine that the motor (e.g., trolling motor) should be used to hold the vessel's position in the water. In either situation, the user merely needs to indicate to the control system a desire to hold the position of the vessel without tinkering with combinations of motors and anchors to determine the correct tool to utilize.

Additionally, the control system can determine what components (primary motor, trolling motor, and/or shallow water anchor) to use during the course of a planned navigation route and automatically activate one or more of the components during each stage of the route. For instance, the system can use the primary motor to navigate and propel the vessel along the route and then determine to deploy the shallow water anchor to hold the vessel in place once the vessel reaches its planned destination or at any other navigational waypoint associated with the route.

The user command can be received via an input device. The input device can be a throttle, a foot controller, a handheld remote, a multi-function display, and/or a chartplotter communicatively coupled to the marine vessel control system. A number of sensors can also be communicatively coupled to the marine vessel control system. The number of sensors can include a global navigation satellite system (GNSS) receiver, a magnetometer, an accelerometer, a gyroscope, a radar sensor, a LIDAR system, and/or a sonar, for example. Commands to the shallow water anchor and/or the motor can be transmitted from the marine vessel control system in response to data from the number of sensors.

The shallow water anchor and/or the motor can be used to maintain the position of a marine vessel and/or move the marine vessel to a desired position in response to a user command. However, conditions may dictate whether use of one or more shallow water anchors, one or more motors, or a combination is ideal to maintain the position of the marine vessel and/or move the marine vessel. Conditions could include one or more characteristics of a water bottom, characteristics of water, and/or characteristics of the marine vessel.

The characteristic of the water bottom could be a composition and/or a water depth relative to the water bottom. In some examples, the processor could transmit a command to use the shallow water anchor in response to the water depth being less than the maximum water depth the shallow water anchor can be used in. This can prevent the shallow water anchor from being deployed in too deep of water where the shallow water anchor cannot maintain the position of the marine vessel.

In a number of embodiments, the use of the shallow water anchor and/or the motor can depend on the composition of the water bottom. For example, the processor can transmit a command to use the motor in response to the water bottom being firm. With a firm water bottom, the shallow water anchor may not be able to dig into the water bottom enough to hold the position of the marine vessel. Also, a firm water bottom may have less material (e.g., sand, muck, etc.) at the water bottom that would be displaced by a propulsion of a motor. The displacement of material could reduce water visibility, sonar accuracy, and/or disrupt (e.g., scare) marine life, which could hinder fishing and/or marine life viewing. Accordingly, the processor can transmit a command to use the shallow water anchor in response to the water bottom being soft to prevent the displacement of material at the water bottom. Similarly, the processor can determine operating characteristics of the anchor—such as how far is it deployed or how quickly it's deployed-based on the composition of the water bottom.

The characteristic of the water could be a height of a swell, a period of the swell, a direction of a current, and/or a speed of the current, for example. A swell could render a shallow water anchor useless where the swell lifts the shallow water anchor off of the water bottom. However, the processor can transmit a command to raise and lower the shallow water anchor based on the height and the period of the swell so that the shallow water anchor can stay in contact with the water bottom, which can prevent the marine vessel from drifting and/or the shallow water anchor from becoming damaged.

The characteristic of the marine vessel could be a position, speed, and/or direction of the marine vessel. The position of the marine vessel can be a location and/or an orientation relative to a shoreline, for example. The speed and/or direction could be due to the marine vessel drifting and/or the marine vessel being underway. The processor can transmit a command to the motor to provide a particular amount of propulsion to counteract the speed of the drift and/or a command to provide propulsion in a particular direction to counteract the direction of the drift. For example, if the shallow water anchor is deployed and the vessel is drifting, the processor can control the motor to provide holding assistance to eliminate the drift and/or adjust the sensitivity of the shallow water anchor to more firmly hold the vessel to the bottom.

Additionally, the control system may utilize GPS information and heading information to monitor for drag, such as undesired movement of the vessel when shallow water anchor is deployed, to automatically adjust deployment characteristics of the anchor (or anchors) to hold the vessel in its desired position and orientation. For instance, control system may control anchor to increase or decrease its sensitivity, deployment depth, etc., when dragging is detected. If control system detects that vessel has moved from a desired holding position, it may automatically reengage navigation to return the vessel, via control of one or more motors and/or retraction of the anchors, to its desired holding position.

In some examples, the control system can transmit a command to raise the shallow water anchor in response to receiving a throttle input while the shallow water anchor is in use. Raising the shallow water anchor when a user takes the motor out of neutral can prevent the shallow water anchor from dragging and potentially damaging the marine vessel, shallow water anchor, marine habitat, and/or marine life. As utilized herein, the term user may mean any operator of the marine vessel. For example, a user may be an owner of the marine vessel, a crew member, a pilot, a passenger, and so forth.

Figure 5:
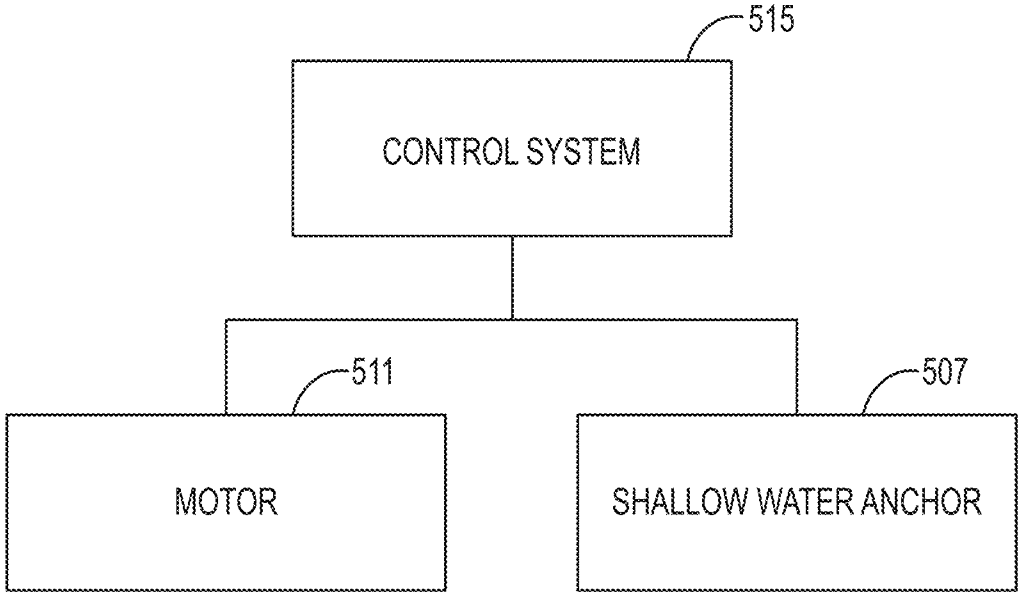
FIG. 5 is a block diagram illustrating a marine vessel control system coupled to a motor and a shallow water anchor.

FIG. 1 is a top view of a marine vessel 100 that can employ a marine vessel control system (e.g., marine vessel control system 515 in FIG. 5). The marine vessel 100 can include a hull 102, a bow 104, a starboard side 108, a port side 106, a stern 110, and/or a transom 112. The hull 102 can be a portion of the marine vessel 100 below the surface of the water. The bow 104 can be a front portion of the marine vessel 100 and the stern 110 and/or transom 112 can be a rear portion of the marine vessel 100. The starboard side 108 is the right side of the marine vessel 100 when facing the bow 104 and the port side 106 is the left side of the marine vessel 100 when facing the bow 104.

The marine vessel 100 can include a marine vessel display system 105. The marine vessel control system can be configured to communicate with the marine vessel display system 105. For example, the marine vessel control system can be communicatively coupled (e.g., wired or wirelessly connected) to the marine vessel display system 105, or included within the marine vessel display system 105 (e.g., as a component of the marine vessel display system 105). The marine vessel display system 105 may be mounted in a marine vessel 100. The marine vessel display system 105 may assist operators of the marine vessel 100 in monitoring information related to the operation of the marine vessel 100. For instance, in some examples, the marine vessel control system, marine vessel display system 105, and various other components described herein are integrated together as a chartplotter. However, in other examples, the marine vessel control system may be integrated with, or form a part of, other components associated with the vessel 100, including for example motors, shallow water anchors, control boxes, combinations thereof, and the like. The marine vessel display system 105 may present various information associated with operation of the motor(s) and shallow water anchor(s), including for example the status of the shallow water anchor. That is, the display system 105 can indicate whether the shallow water anchor is deployed, whether the anchor and/or trolling motor will be deployed at the end of the navigation route, alerts regarding the use of the anchor such as whether depth prevents the use of the anchor or if the anchor is deployed while the user is engaging the vessel's main throttle, setting and configuration information for the shallow water anchor, combinations thereof, and the like.

The status information presented by the display system 105 may include battery and charge information to allow the user to manage the status of the batteries that power components of the vessel such as trolling motor and shallow water anchor. Touch buttons, slider bars, knobs, and other user interface elements may be presented to allow the user to easily deploy, retract, and set settings regarding the shallow water anchor. For example, the display system 105 can enable the user to change anchor sensitivity and/or speed utilizing various control elements.

The marine vessel display system 105 can employ a plurality of independent displays 101-1, 101-2, 101-3, 101-4, and 101-5. Two or more of the displays 101-1, . . . , 101-5 may be mounted proximate (e.g., adjacent) to one another to form one or more display stations 103-1 and 103-2 in the marine vessel 100. For example, three displays 101-1, 101-2, and 101-3 may be mounted together to form a first display station 103-1 in a first area of the marine vessel 100 and two other displays 101-4 and 101-5 may be mounted together to form a second display station 103-2 in a second area of the marine vessel 100. The marine vessel display system 105 may also include additional displays 101 grouped into one or more additional display stations. The embodiments described herein and shown in the figures are example implementations of the technology; however, it is contemplated that any number of displays 101 and/or display stations 103 can be employed by the marine vessel display system 105.

Figure 2:
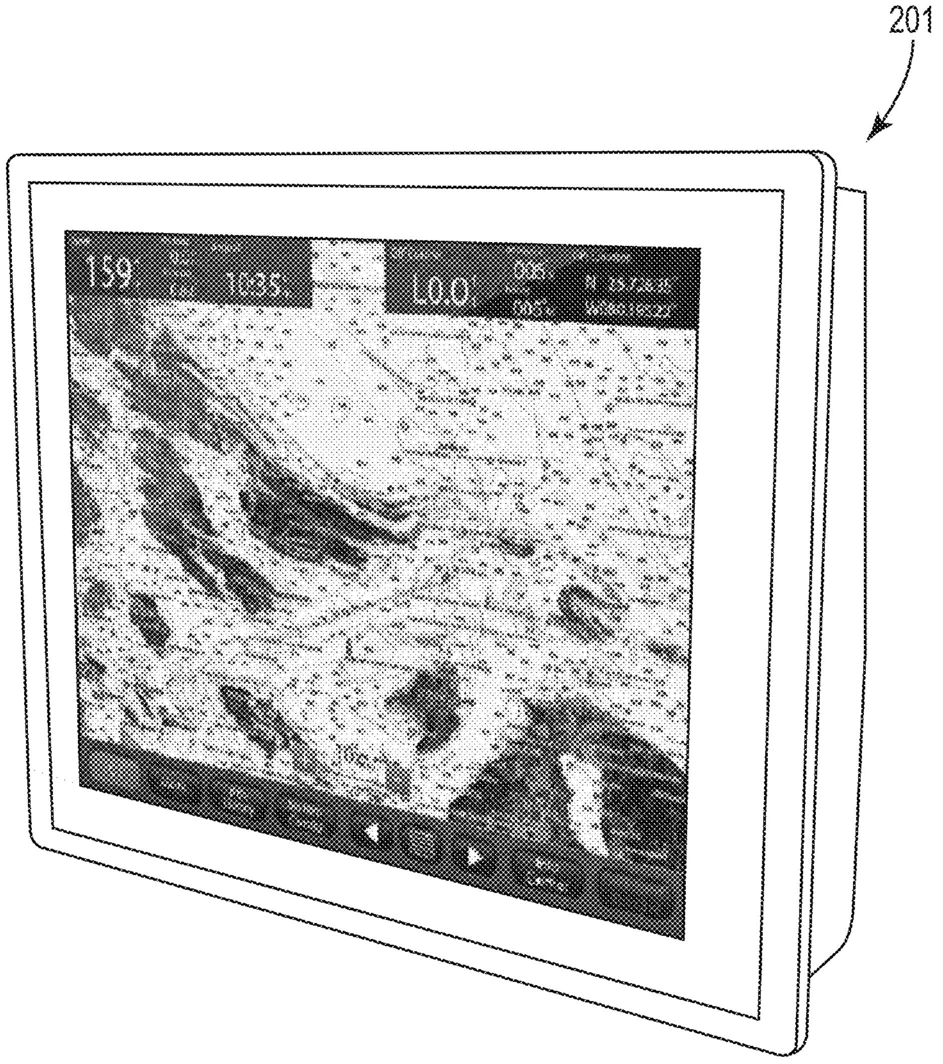
FIG. 2 is a perspective view of a display for a marine vessel control system.

FIG. 2 is a perspective view of a display 201 for a marine vessel control system (e.g., marine vessel control system 515 in FIG. 5). Display 201 can correspond to one of the number of displays 101-1, . . . , 101-5 in FIG. 1. The display 201 can display text, data, graphics, images, and other information.

The display 201 may be a liquid crystal display (LCD), light-emitting diode (LED) display, light-emitting polymer (LEP) display, thin film transistor (TFT) display, gas plasma display, or any other type of display. The display 201 may be backlit such that it may be viewed in the dark or other low-light environments. The display 201 may be of any size and/or aspect ratio, and in one or more embodiments, may be 15 inches, 17 inches, 19 inches, or 24 inches measured diagonally. In some embodiments, the display 201 may include a touchscreen display. The touchscreen display may employ any touchscreen technology, including, but not limited to, resistive, capacitive, or infrared touchscreen technologies, or any combination thereof.

User commands can be received via display 201. For example, a shallow water anchor (e.g., shallow water anchor 307 in FIGS. 3A and 3B) can be raised and/or lowered in response to an operator selecting a button shown on display 201. In some examples, a motor (e.g., motor 311 in FIGS. 3A and 3B) can be turned on, turned off, and/or actuated in response to an operator selecting a button shown on display 201.

Figure 3A:
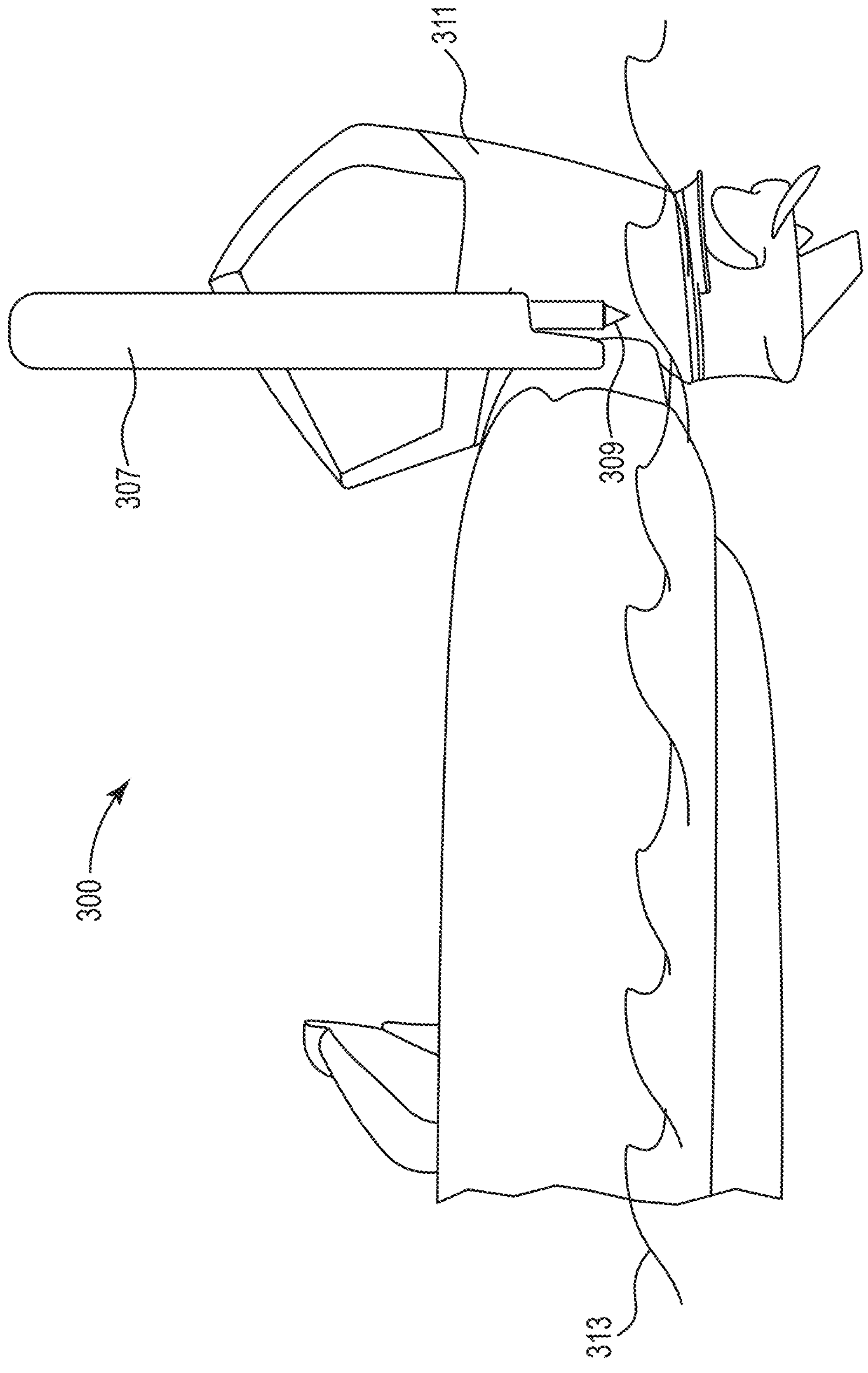
FIG. 3A is partial side view of a marine vessel including a motor and a shallow water anchor in a raised position.
Figure 3B:
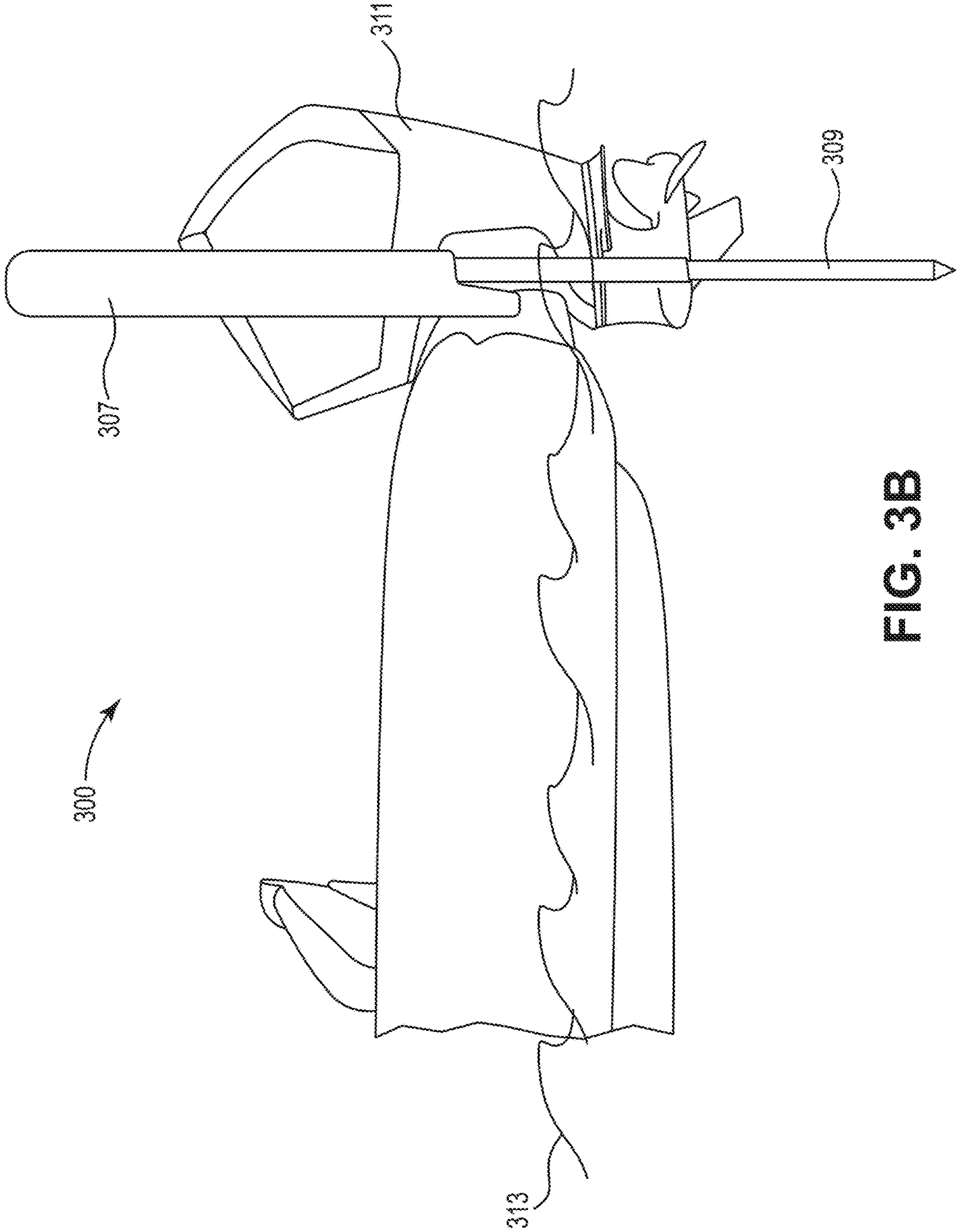
FIG. 3B is partial side view of a marine vessel including a motor and a shallow water anchor in a lowered position.

FIG. 3A is a partial side view of a marine vessel 300 including a motor 311 and a shallow water anchor 307 in a raised position. FIG. 3B is a partial side view of the marine vessel 300 including the motor 311 and the shallow water anchor 307 in a lowered position.

Marine vessel 300 can correspond to marine vessel 100 in FIG. 1. The motor 311 and the shallow water anchor 307 can be mounted to a stern (e.g., stern 110 in FIG. 1) of the marine vessel 300, as illustrated in FIGS. 3A and 3B. However, the motor 311 and/or shallow water anchor 307 can be mounted to any portion of the marine vessel 300 and the vessel 300 may include any number of motors or shallow water anchors.

The motor 311 can be a trolling motor, a thruster, and/or a propulsion motor such as an outboard or inboard motor. The motor 311 may be a gas-powered engine or battery (electric) powered. The motor 311 can provide port-to-starboard, starboard-to-port, bow-to-stern, and/or stern-to-bow propulsion. This can move the marine vessel 300 forward or backward and/or turn or spin the marine vessel 300.

The shallow water anchor 307 can be used to anchor the marine vessel 300 to a lakebed or another underwater surface. The shallow water anchor 307 can be hydraulically or electrically driven. Instead of using cables, ropes, or other conventional anchoring elements, the shallow water anchor fixedly anchors the vessel 300 to the underwater surface through deploying (and retracting) a pole, rod, or other element such as spear 309.

As shown in FIG. 3A, the spear 309 can be retracted into the body of the shallow water anchor 307 and thus the spear 309 can be held out of the water 313 or near the surface of the water 313. When the user deploys the shallow water anchor 307, the spear 309 can extend from the body of the shallow water anchor 307 and thus into the water 313, as shown in FIG. 3B. In this state, the shallow water anchor 307 can anchor the marine vessel 300 in place, as shown in FIG. 3B.

Figure 4A:
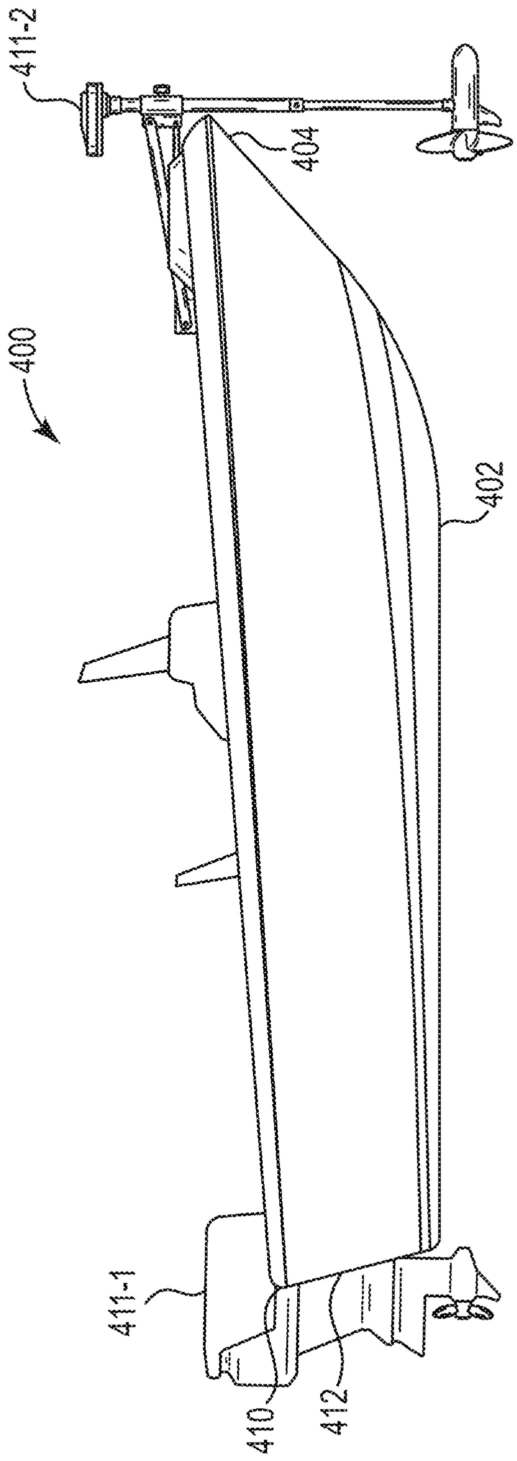
FIG. 4A is a side view of a marine vessel including a number of motors.

FIG. 4A is a side view of a marine vessel 400 including a number of motors 411-1 and 411-2. Marine vessel 400 can correspond to marine vessel 300 in FIGS. 3A and 3B and one of the number of motors 411-1 and 411-2 can correspond to motor 311 in FIGS. 3A and 3B. Hull 402, bow 404, stern 410, and transom 412 can correspond to hull 102, bow 104, stern 110, and transom 112 in FIG. 1, respectively.

The number of motors 411-1 and 411-2 can be different types of motors and can be coupled to the marine vessel 400 in different locations. As illustrated in FIG. 4A, motor 411-1 can be mounted at the stern 410 of the marine vessel 400, while motor 411-2 can be mounted at the bow 404 of the marine vessel 400. Motor 411-1 can be a propulsion motor and motor 411-2 can be a trolling motor, as illustrated in FIG. 4A.

Figure 4B:
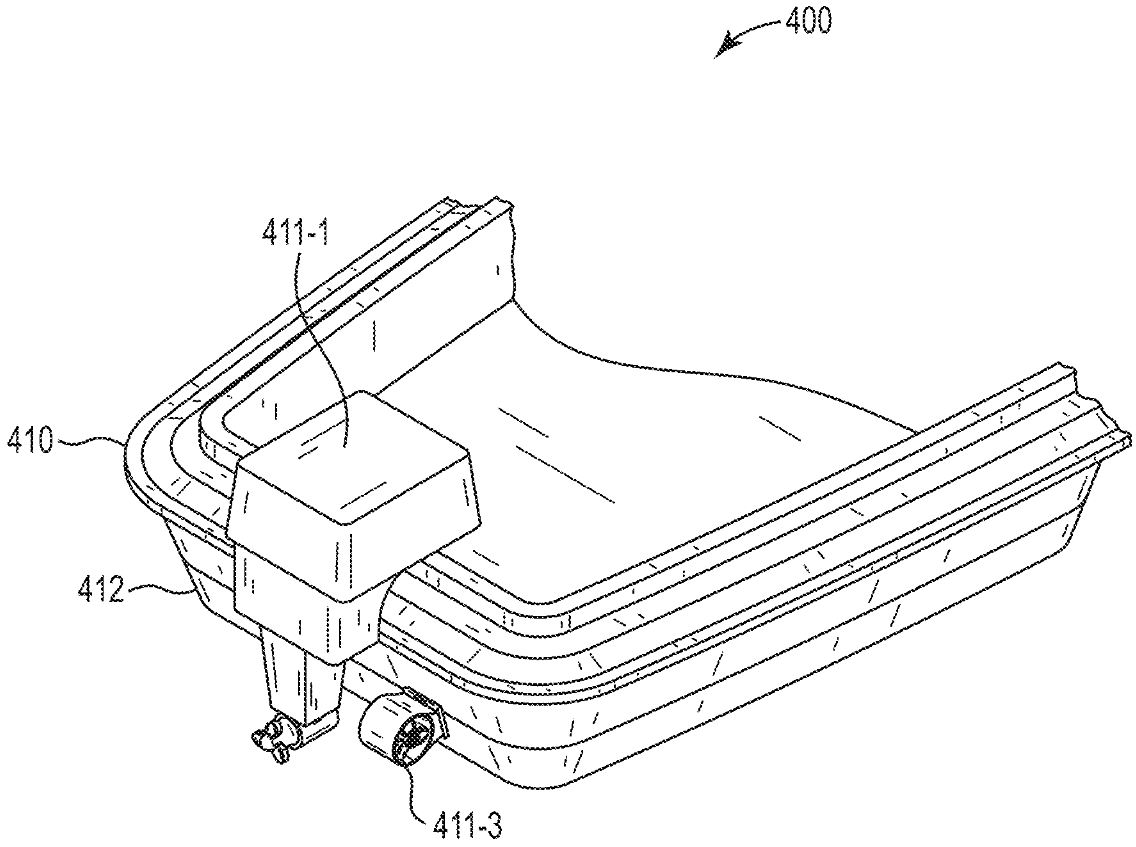
FIG. 4B is a perspective view of a rear portion of a marine vessel including a number of motors.

FIG. 4B is a perspective view of a rear portion of a marine vessel 400 including a number of motors 411-1 and 411-3. Motor 411-3 can be mounted at to the transom 412 of the marine vessel 400. However, motor 411-3 can be mounted to and/or built into any portion of the hull 402. As illustrated in FIG. 4B, the motor 411-3 can be a thruster.

FIG. 5 is a block diagram illustrating a marine vessel control system 515 coupled to a motor 511 and a shallow water anchor 507. The motor 511 can correspond to one of the number of motors 411-1, 411-2, and 411-3 in FIGS. 4A and 4B and the shallow water anchor 507 can correspond to shallow water anchor 307 in FIGS. 3A and 3B.

The marine vessel control system 515 can be used to navigate or moor a marine vessel (e.g., marine vessel 400 in FIGS. 4A and 4B). The marine vessel control system 515 can be operable to be used with the shallow water anchor 507 and/or the motor 511. For example, the marine vessel control system 515 can send signals to the shallow water anchor 507 to control operation thereof and/or to the motor 511 to control operation thereof.

FIGS. 6A, 6B, 6C, and 6D are block diagrams illustrating components of a marine vessel control system 615. Marine vessel control system 615 can correspond to marine vessel control system 515 in FIG. 5.

Figure 6A:
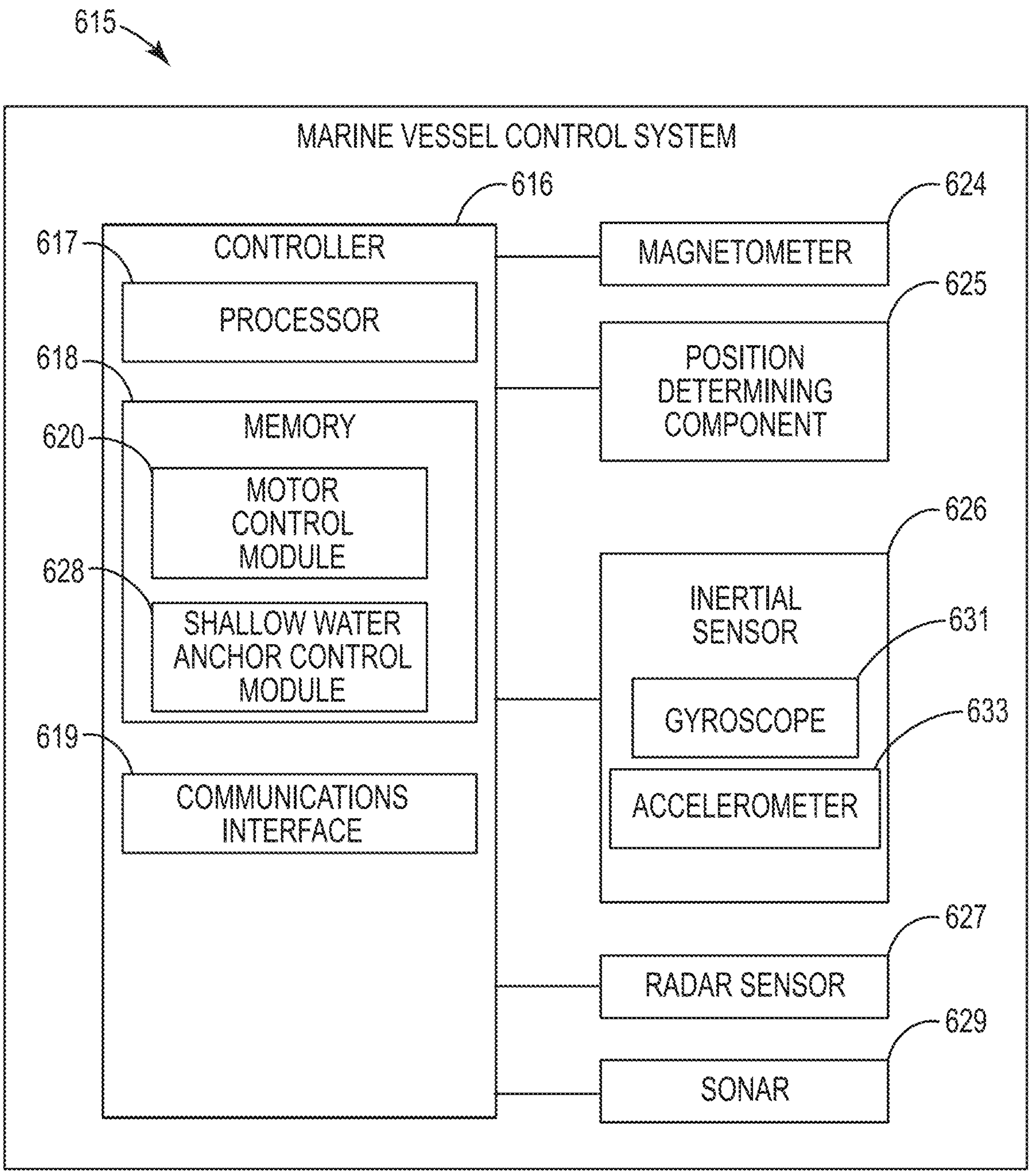
FIG. 6A is a block diagram illustrating components of a marine vessel control system.

As shown in FIG. 6A, the marine vessel control system 615 may include one or more sensors for detecting an orientation, change in orientation, direction, change in direction, position, and/or change in position of the marine vessel (e.g., marine vessel 400 in FIGS. 4A and 4B). For example, the marine vessel control system 615 may include a position determining component 625 that is configured to detect a position measurement for the marine vessel (e.g., geographic coordinates of at least one reference point on the marine vessel, such as a motor location, center of the marine vessel, bow location, stern location, etc.). In at least one embodiment, the position determining component 625 is a global navigation satellite system (GNSS) receiver (e.g., a global positioning system (GPS) receiver, software defined (e.g., multi-protocol) receiver, or the like). In some embodiments, the marine vessel control system 615 is configured to receive a position measurement from another device. For example, the marine vessel control system 615 may be configured to receive a position measurement from an external position determining component/device or from a motor (e.g., motor 511 in FIG. 5) and/or a shallow water anchor (e.g., shallow water anchor 507 in FIG. 5).

In some embodiments, the marine vessel control system 615 may include a magnetometer 624 configured to detect an orientation measurement for the marine vessel. For example, the magnetometer 624 can be configured to detect a direction in which the bow of the marine vessel is pointed and/or a heading of the marine vessel. The magnetometer 624 may be calibrated by pointing the magnetometer 624 in at least one reference direction (e.g., North, East, South, West, etc.), where the magnetometer 624 registers at least one reference direction and detects changes in the pointing direction or heading of the marine vessel relative to the reference direction.

In some embodiments, the marine vessel control system 615 is configured to receive an orientation measurement from another device. For example, the marine vessel control system 615 may be configured to receive an orientation measurement (e.g., a direction in which the bow of the marine vessel is pointed, a heading of the marine vessel, and/or vector coordinates defined by at least two reference points) from an external magnetometer, position determining component(s)/device(s), a motor, and/or a shallow water anchor. Non-limiting examples of such reference points include motor locations, bow and stern locations, etc.

In some embodiments, the marine vessel control system 615 includes or is communicatively coupled with at least one inertial sensor 626 for detecting the orientation or change in orientation of the marine vessel. For example, an inertial sensor 626 can be used instead of or in addition to the magnetometer 624 to detect the orientation measurement for the marine vessel. The inertial sensor 626 can be and/or include a gyroscope 631 and/or an accelerometer 633.

The marine vessel control system 615 may include a radar sensor 627 configured to detect an object's position, shape, and motion. For example, the radar sensor 627 can be configured to detect flocks of birds at the water's surface where baitfish are likely to be found. In a number of embodiments, the radar sensor 627 can profile weather cells including wind speed and/or precipitation, for example.

A sonar system 629 can be included in or coupled to the marine vessel control system 615. The sonar system 629 can include one or more sonar transducers, such as a piezoelectric element, and associated sonar electronics to send and receive electrical signals to and from the sonar transducer. The sonar system 629 can generate sonar data for use by the marine vessel control system 615. In some examples, the sonar transducer may include a puck-like transducer that generates a conical sonar beam. However, in other embodiments, the sonar transducer can include live sonar elements, like phased-array or frequency-steered components, to generate sonar data for use by the system 15. The sonar system 629 can profile a water bottom, determine a composition and/or a water depth relative to the water bottom, and/or provide sonar data to the marine vessel control system 615 to the calculation of sonar-related data such as depth and the like.

The marine vessel control system 615 can include a controller 616 communicatively coupled to one or more components of the marine vessel control system 615. For example, the controller 616 can be communicatively coupled to the magnetometer 624, the position determining component 625, the inertial sensor 626, the radar sensor 627, and/or the sonar 629. The controller 616 may be configured to receive data from the magnetometer 624, the position determining component 625, the inertial sensor 626, the radar sensor 627, and/or the sonar 629.

Figure 6B:
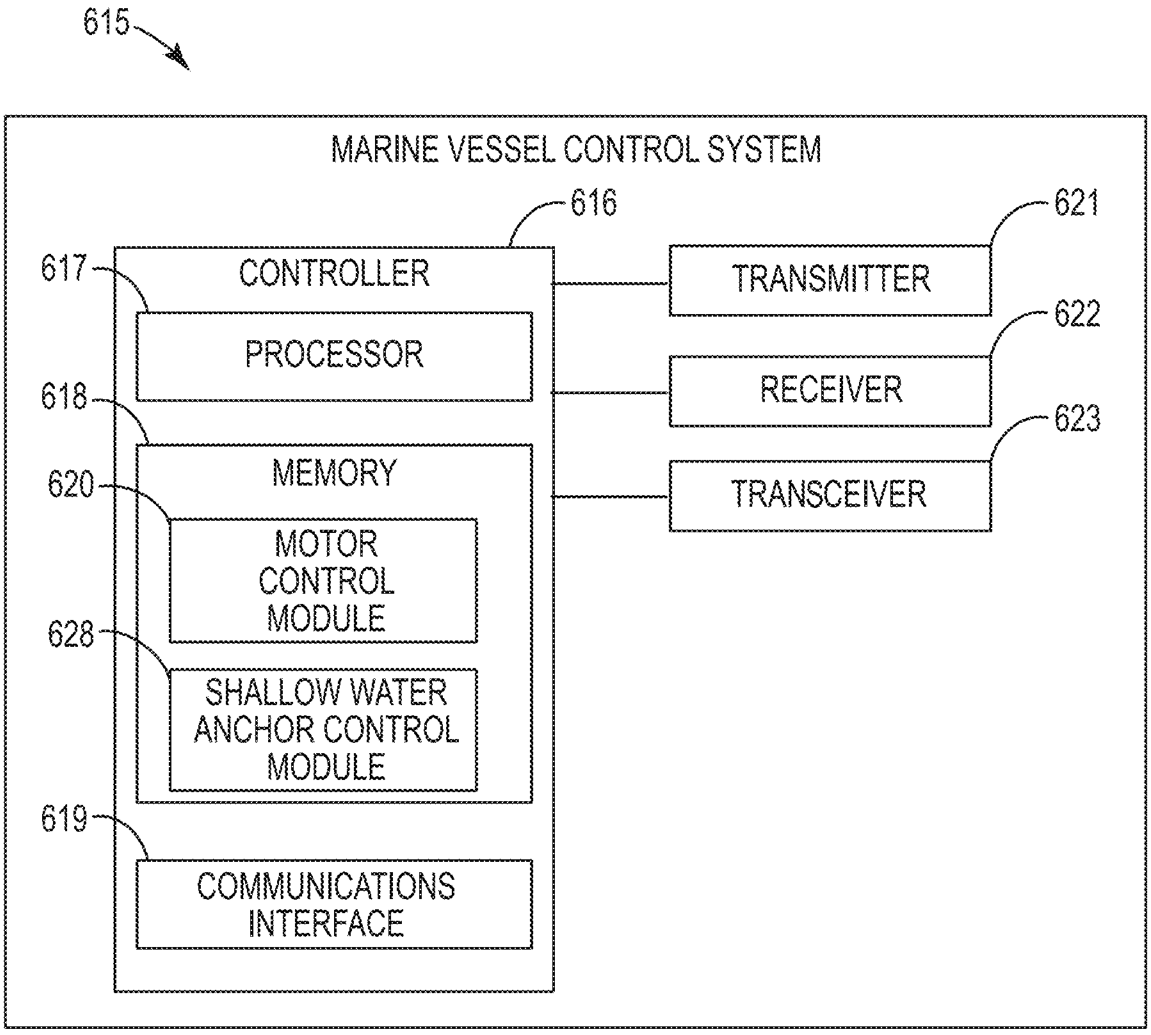
FIG. 6B is a block diagram illustrating components of a marine vessel control system.

In at least one embodiment, the controller 616 can be configured to receive data from another device, including the motor and/or the shallow water anchor of the marine vessel. For example, the controller 616 can receive data via a receiver 622 and/or transceiver 623 of the marine vessel control system 615, as illustrated in FIG. 6B.

In some examples, the marine vessel control system 615 can include a wired and/or wireless transceiver 623, receiver 622, and/or transmitter 621. The marine vessel control system 615 can use a combination of wired and wireless communication protocols for communicating with the motor, shallow water anchor, and/or other devices on the marine vessel.

The controller 616 can be communicatively coupled with some or all of the components of the marine vessel control system 615. The controller 616 has a processor 617 included with or in the controller 616 to control the components and functions of the marine vessel control system 615 described herein using software, firmware, hardware (e.g., fixed logic circuitry), or a combination thereof. The terms "controller," "functionality," "service," and "logic" as used herein generally represent software, firmware, hardware, or a combination of software, firmware, or hardware in conjunction with controlling the marine vessel control system 615. As shown in FIGS. 6A-6D, the controller 616 can include a processor 617, a memory 618, and a communications interface 619.

The processor 617 provides processing functionality for at least the controller 616 and can include any number of processors, micro-controllers, circuitry, field programmable gate array (FPGA) or other processing systems, and resident or external memory for storing data, executable code, and other information accessed or generated by the controller 616. The processor 617 can execute one or more software programs (e.g., motor control module 620 and/or shallow water anchor control module 628) embodied in a non-transitory computer readable medium (e.g., memory 618) that implement techniques described herein. The processor 617 is not limited by the materials from which it is formed or the processing mechanisms employed therein and, as such, can be implemented via semiconductor(s) and/or transistors (e.g., using electronic integrated circuit (IC) components), and so forth.

The memory 618 can be a tangible, computer-readable storage medium that provides storage functionality to store various data and/or program code associated with operation of the controller 616, such as software programs and/or code segments, or other data to instruct the processor 617, and possibly other components of the marine vessel control system 615, to perform the functionality described herein. The memory 618 can store data, such as program instructions (e.g., motor control module 620 and/or shallow water anchor control module 628) for operating the marine vessel control system 615 including its components, and so forth. It should be noted that while a single memory 618 is described, a wide variety of types and combinations of memory (e.g., tangible, non-transitory memory) can be employed. The memory 618 can be integral with the processor 617, can comprise stand-alone memory, or can be a combination of both. Some examples of the memory 618 can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In embodiments, the marine vessel control system 615 and/or the memory 618 can include removable integrated circuit card (ICC) memory, such as memory provided by a subscriber identity module (SIM) card, a universal subscriber identity module (USIM) card, a universal integrated circuit card (UICC), and so on.

The communications interface 619 can be operatively configured to communicate with components of the marine vessel control system 615. For example, the communications interface 619 can be configured to transmit data for storage in the marine vessel control system 615, retrieve data from storage in the marine vessel control system 615, and so forth. The communications interface 619 can also be communicatively coupled with the processor 617 to facilitate data transfer between components of the marine vessel control system 615 and the processor 617 (e.g., for communicating inputs to the processor 617 received from a device communicatively coupled with the controller 616, including, but not limited to, data received from the magnetometer 624, position determining component 625, inertial sensor 626, radar sensor 627, sonar 629, and/or any other component of the marine vessel control system 615).

It should be noted that while the communications interface 619 is described as a component of controller 616, one or more components of the communications interface 619 can be implemented as components of the marine vessel control system 615 or components communicatively coupled to the marine vessel control system 615 via a wired and/or wireless connection. For example, the marine vessel control system 615 and/or the controller 616 can include the transmitter 621, the receiver 622, and/or the transceiver 623 for sending and/or receiving communications (e.g., control signals, position, and/or orientation measurements, etc.) to/from the motor and/or shallow water anchor. In a number of embodiments, the transmitter 621, receiver 622, and/or transceiver 623 can be directly coupled (e.g., wired) to the motor and/or the shallow water anchor or configured to wirelessly communicate with the motor and/or the shallow water anchor.

The marine vessel control system 615 can also include and/or can connect to one or more input/output (I/O) devices via the communications interface 619, such as a display, a mouse, a touchpad, a touchscreen, a keyboard, a microphone (e.g., for voice commands), and so on. In embodiments, the marine vessel control system 615 and/or the communications interface 619 can include an input device configured to receive user inputs. For example, the input device can include, but is not limited to, an electromechanical input device (e.g., a button, switch, toggle, trackball, or the like), a touch-sensitive input device (e.g., a touchpad, touch panel, trackpad, or the like), a pressure-sensitive input device (e.g., a force sensor or force-sensitive touchpad, touch panel, trackpad, button, switch, toggle, trackball, or the like), an audio input device (e.g., microphone), a camera (e.g., for detecting user gestures, or for face and/or object recognition), or a combination thereof.

In a number of embodiments, the processor 617 can be configured to generate and communicate a control signal for the motor and/or the shallow water anchor. For example, the marine vessel control system 615 can be configured to generate one or more control signals and/or configured to communicate data (e.g., commands, sensor data, user inputs, etc.) to the motor and/or the shallow water anchor.

Figure 6C:
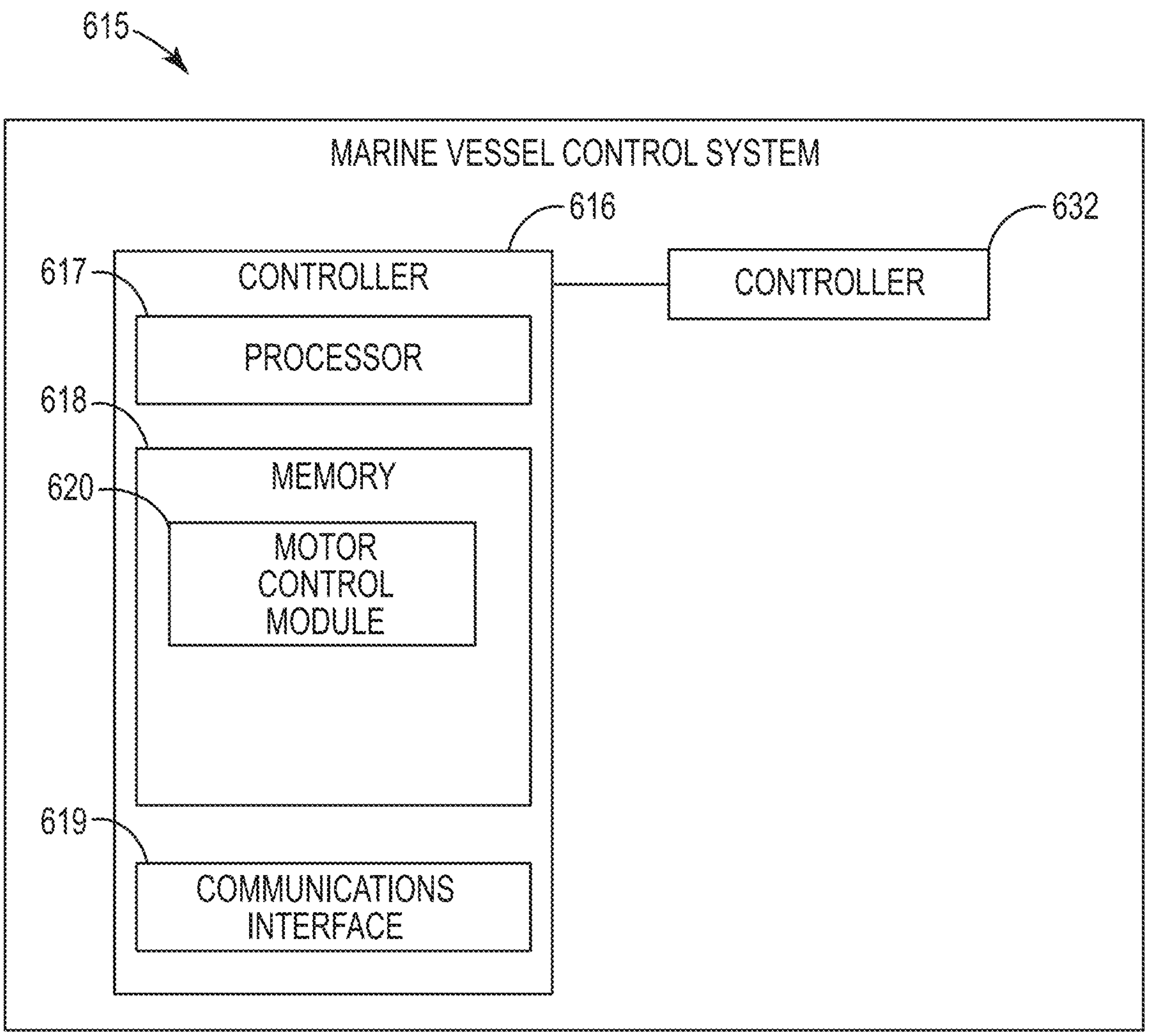
FIG. 6C is a block diagram illustrating components of a marine vessel control system.

In some embodiments, such as the embodiment shown in FIG. 6C, the marine vessel control system 615 is at least partially integrated within the motor. For example, at least a portion of the marine vessel control system 615 can be embedded within or attached to the motor. In some embodiments, the marine vessel control system 615 can include controller 632. Controller 632 can be communicatively coupled to controller 616 or can replace controller 616 and perform some or all of the functions or operations described herein with regard to controller 616. In this regard, the marine vessel control system 615 can be implemented as a distributed control system with controller 616 and/or controller 632 including processor 617 to perform the functions or operations of the marine vessel control system 615. For example, the one or more controllers can execute the motor control module 620 as one master controller, one master controller with one or more slave controllers, or as a distributed set of the controllers performing operations together, sequentially or at least partially in parallel. References herein to the marine vessel control system 615 can include functions or operations performed by processor 617 included in controller 616 and/or controller 632.

Figure 6D:
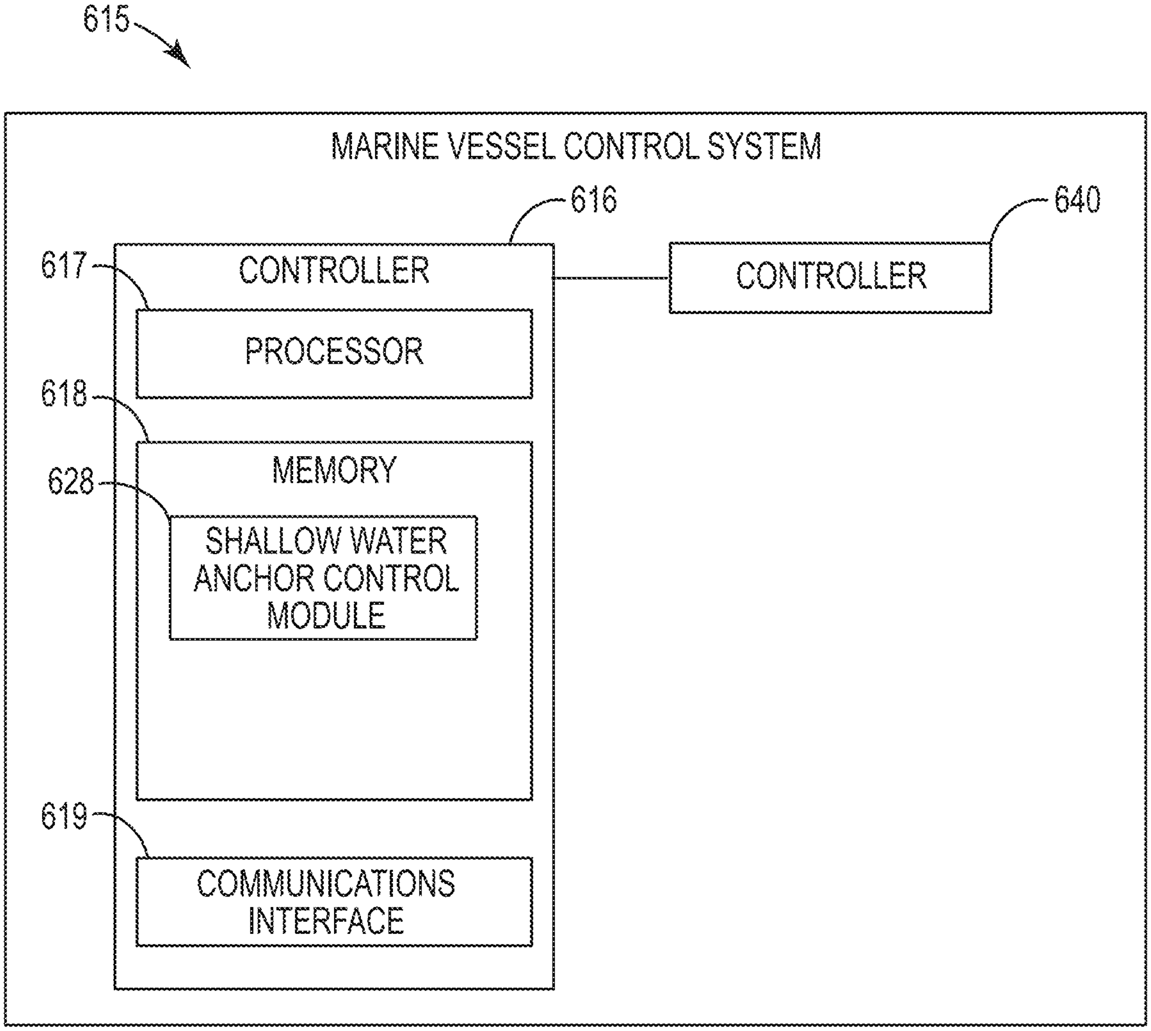
FIG. 6D is a block diagram illustrating components of a marine vessel control system.

In some embodiments, such as the embodiment shown in FIG. 6D, the marine vessel control system 615 is at least partially integrated within the shallow water anchor. For example, at least a portion of the marine vessel control system 615 can be embedded within or attached to the shallow water anchor. In some embodiments, the marine vessel control system 615 can include controller 640. Controller 640 can be communicatively coupled to controller 616 or can replace controller 616 and perform some or all of the functions or operations described herein with regard to controller 616. In this regard, the marine vessel control system 615 can be implemented as a distributed control system with controller 616 and/or controller 640 including processor 617 performing the functions or operations of the marine vessel control system 615. For example, the one or more controllers can execute the shallow water anchor control module 628 as one master controller, one master controller with one or more slave controllers, or as a distributed set of the controllers performing operations together, sequentially or at least partially in parallel. References herein to the marine vessel control system 615 can include functions or operations performed by processor 617 included in controller 616 and/or controller 640.

In a number of embodiments, the processor 617 can receive a user command to maintain a position of the marine vessel and/or move the marine vessel to a desired position. The position and/or the desired position of the marine vessel can be a location and/or an orientation relative to a shoreline. The user may want to maintain the position of the marine vessel at a dock, a landing, and/or a fishing spot, for example.

The desired position can be one of a number of waypoints along a navigational route. For example, the shallow water anchor can be deployed or the motor can be used to maintain the marine vessel in the desired position once the marine vessel reaches the desired position and/or the shallow water anchor can be deployed or the motor can be used to maintain the marine vessel at an end of the navigational route once the marine vessel reaches the end of the navigational route. In some examples, the processor 617 can receive a command to store the desired position as one of the number of waypoints in the memory 618.

Figure 9A:
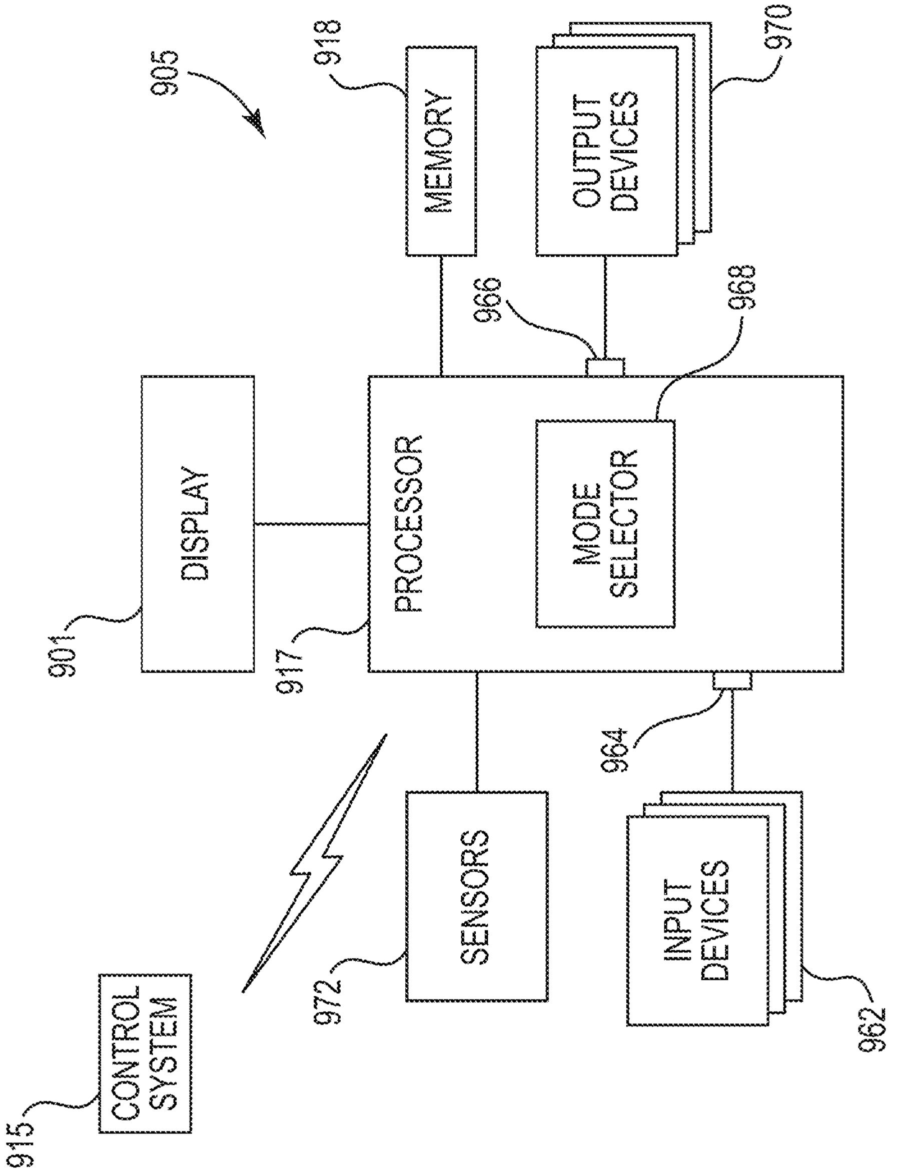
FIG. 9A is a block diagram of a marine vessel display system and a marine vessel control system.
Figure 9B:
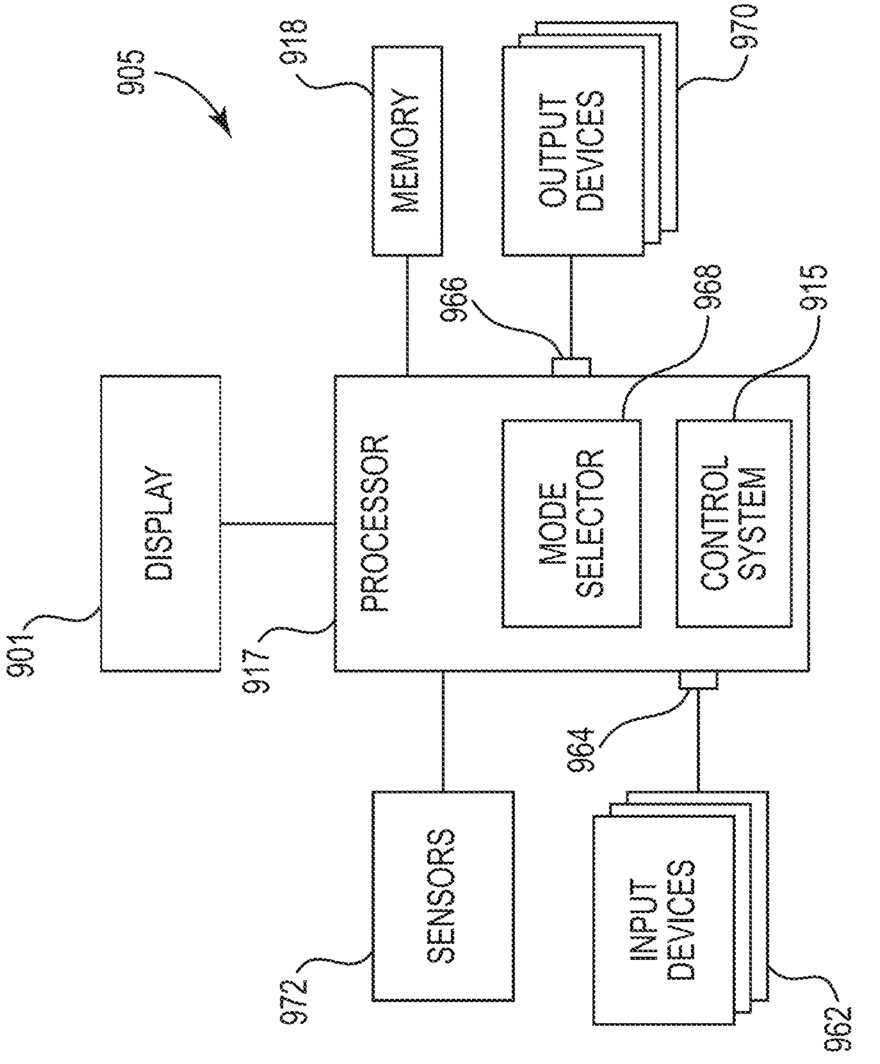
FIG. 9B is a block diagram of a marine vessel display system and a marine vessel control system.

The user command can be received via an input device (e.g., input device 962 in FIGS. 9A and 9B). The input device can be a throttle, a foot controller, a handheld remote, a multi-function display, and/or a chartplotter communicatively coupled to the marine vessel control system 615, for example.

Conditions may dictate whether use of one or more shallow water anchors, one or more motors, or a combination is ideal to maintain the position of the marine vessel and/or move the marine vessel. Conditions could include one or more characteristics of a water bottom, characteristics of water, and/or characteristics of the marine vessel.

The conditions can be determined using data from a number of sensors. The number of sensors can be communicatively coupled to the marine vessel control system 615. The number of sensors can include the position determining component 625, the magnetometer 624, the inertial sensor 626, the radar sensor 627, and/or the sonar 629.

In a number of embodiments, the processor 617 can determine a characteristic of a water bottom based on sonar data from the sonar 629 in response to receiving the user command. The characteristic of the water bottom can be a composition and/or a water depth relative to the water bottom.

The command can be transmitted from the processor 617 to use the shallow water anchor and/or the motor based on the water depth relative to the water bottom. The command can be transmitted to use the shallow water anchor in response to the water depth being less than a particular water depth. For example, the particular water depth may be the maximum depth in which the shallow water anchor can function. Accordingly, the command can be transmitted to use the motor in response to the water depth being greater than the particular water depth.

In a number of embodiments, the use of the shallow water anchor and/or the motor can depend on the composition of the water bottom. The command can be transmitted to use the motor in response to the sonar data including a number of signals above a signal threshold. A number of signals above the signal threshold can indicate a firm water bottom (e.g., rock). Accordingly, the motor may be more effective at maintaining a position of the marine vessel than the shallow water anchor. For example, the shallow water anchor may not be able to dig into the water bottom enough to hold the position of the marine vessel and may drag on a firm water bottom. Also, a firm water bottom may have less material (e.g., sand, muck, etc.) at the water bottom that would be displaced by propulsion of a motor.

The command can be transmitted to use the shallow water anchor in response to the sonar data including a number of signals below a signal threshold, which can indicate a soft bottom. The shallow water anchor may be able to sink deep into a soft water bottom and hold the marine vessel in its position without displacing material at the water bottom that could reduce water visibility, sonar accuracy, and/or disrupt marine life, which could hinder fishing and/or marine life viewing.

The characteristic of the water could be a height of a swell, a period of the swell, a direction of a current, and/or a speed of the current, for example. A swell could render a shallow water anchor useless where the swell lifts the shallow water anchor off of the water bottom. However, the processor 617 can transmit a command to raise and lower the shallow water anchor based on the height and the period of the swell so that the shallow water anchor can stay in contact with the water bottom, which can prevent the marine vessel from drifting and/or the shallow water anchor from becoming damaged.

The characteristic of the marine vessel could be a position, speed, and/or direction of the marine vessel. The position of the marine vessel can be a location and/or an orientation relative to a shoreline, for example. The speed and/or direction could be due to the marine vessel drifting and/or the marine vessel being underway. The processor 617 can transmit a command to the motor to provide a particular amount of propulsion to counteract the speed of the drift and/or a command to provide propulsion in a particular direction to counteract the direction of the drift to maintain a particular heading of the marine vessel. For example, if a user is fishing a shoreline, the user may desire to keep the marine vessel parallel to the shoreline to allow multiple anglers to fish the shoreline without getting their fishing lines tangled. The location of the marine vessel can be determined by a casting distance. For example, the distance of the marine vessel from the shoreline can be based on the casting distance to prevent fishing lines from getting tangled on shore.

The processor 617 can transmit a command to deploy the shallow water anchor when the marine vessel reaches a desired position. In a number of embodiments, the processor 617 can transmit a command to use the shallow water anchor as a pivot point to get the marine vessel to the desired position. For example, the marine vessel may be in the desired location, but not the desired orientation. Accordingly, the processor 617 can transmit a command to lower the shallow water anchor and another command to use propulsion of the motor to move to and/or maintain the marine vessel in the desired orientation.

In some examples, the processor 617 can transmit a command to raise the shallow water anchor in response to receiving a throttle input while the shallow water anchor is in use. Raising the shallow water anchor when a user takes the motor out of neutral can prevent the shallow water anchor from dragging and potentially damaging the marine vessel, shallow water anchor, marine habitat, and/or marine life.

Figure 7A:
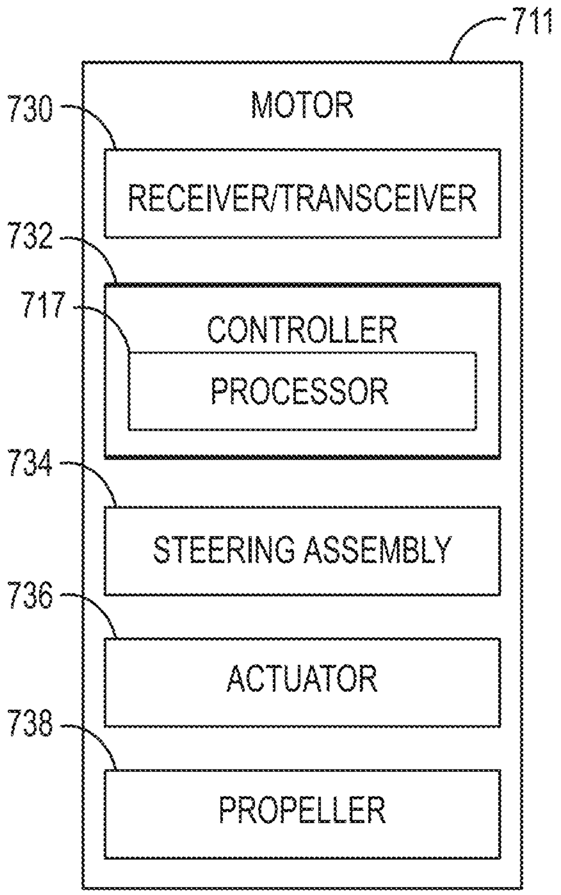
FIG. 7A is a block diagram illustrating components of a motor.
Figure 7B:
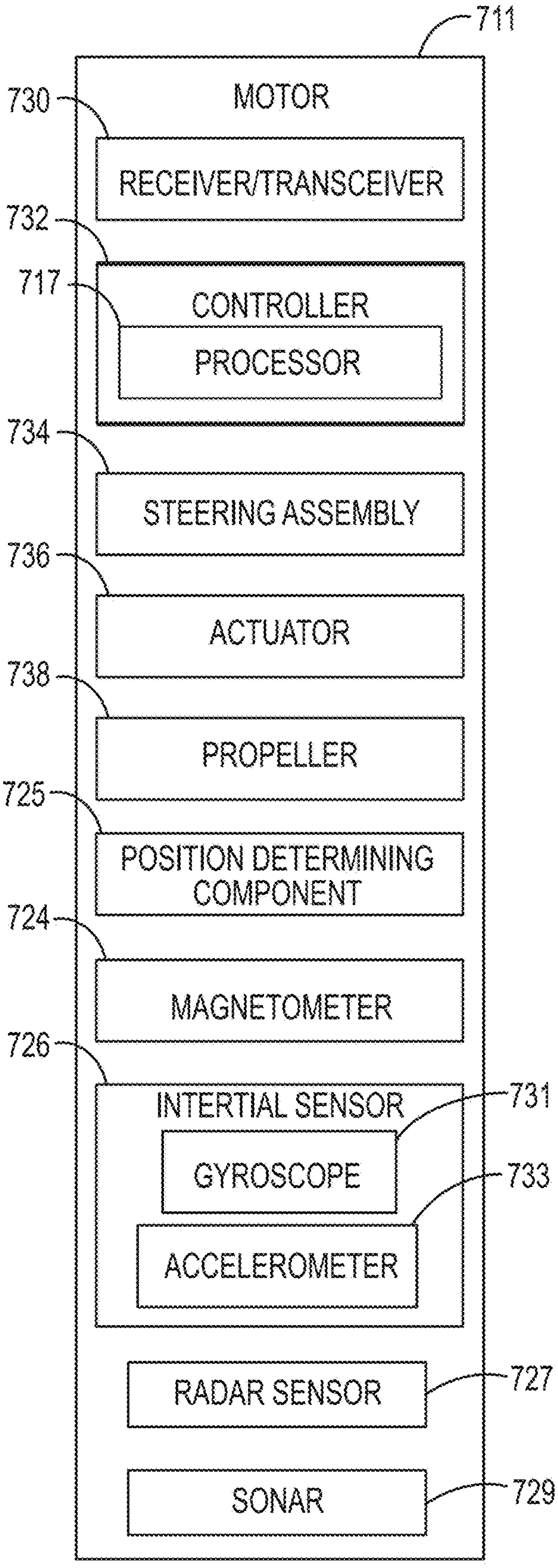
FIG. 7B is a block diagram illustrating components of a motor.

FIGS. 7A and 7B are block diagrams illustrating components of a motor 711. The motor 711 can include components and/or circuitry for communicating with the marine vessel control system (e.g., marine vessel control system 615 in FIGS. 6A-6D). The motor 711 may include or may be coupled to a receiver/transceiver 730. In some embodiments, the motor 711 can include or be coupled to a transmitter. The receiver/transceiver 730 and/or the transmitter can be configured to receive control signals and/or other communications from the marine vessel control system. For example, the receiver/transceiver 730 can be communicatively coupled to the marine vessel control system via a wired or wireless connection.

The motor 711 may also include or may be coupled to a controller 732. Controller 732 can correspond to controller 632 in FIG. 6C and may include components and/or circuitry as described above with regard to controller 616 and/or controller 632. For example, controller 732 can include processor 717, which can correspond to processor 617 in FIGS. 6A-6D. The processor 717 can be configured to control a steering assembly 734 (e.g., electromechanical steering assembly) and/or an actuator 736 (e.g., motor) that drives the propeller 738 of the motor 711. In embodiments, the processor 717 can be configured to turn, change the rotational direction of, and/or change the rotational speed of the propeller 738 by controlling the steering assembly 734 and/or actuator 736 based on control signals received from the marine vessel control system. In some examples, the processor 717 itself is configured to generate the control signals or a portion thereof based on communication data (e.g., measurements, user inputs, sensor data, etc.) received from the marine vessel control system, the shallow water anchor (e.g., shallow water anchor 507 in FIG. 5), and/or sensors.

The motor 711 may also include one or more sensors including a position determining component 725, a magnetometer 724, an inertial sensor 726, a radar sensor 727, and/or a sonar 729, as illustrated in FIG. 7B. The inertial sensor 726 can include an/or be coupled to a gyroscope 731 and/or an accelerometer 733. The position determining component 725, magnetometer 724, inertial sensor 726, gyroscope 731, accelerometer 733, radar sensor 727, and/or sonar 729 can correspond to position determining component 625, magnetometer 624, inertial sensor 626, gyroscope 631, accelerometer 633, radar sensor 627, and/or sonar 629 in FIG. 6A, respectively. The processor 717 can be configured to generate control signals at least partially based on sensor data collected by the one or more sensors and/or can be configured to communicate the sensor data to the marine vessel control system and/or a shallow water anchor.

Figure 8A:
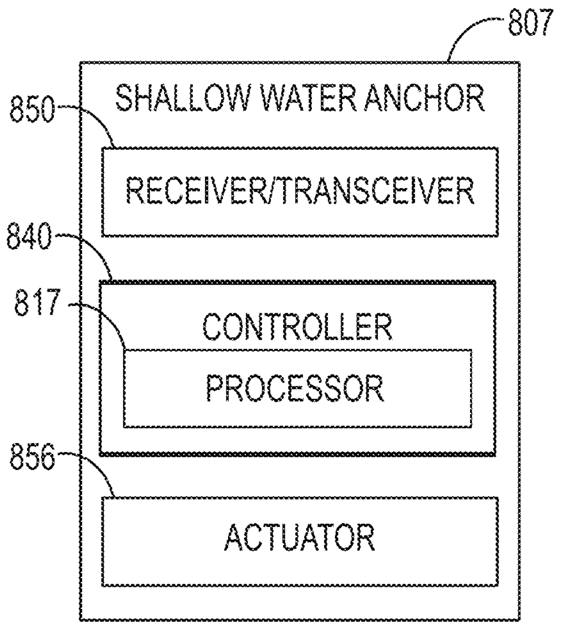
FIG. 8A is a block diagram illustrating components of a shallow water anchor.
Figure 8B:
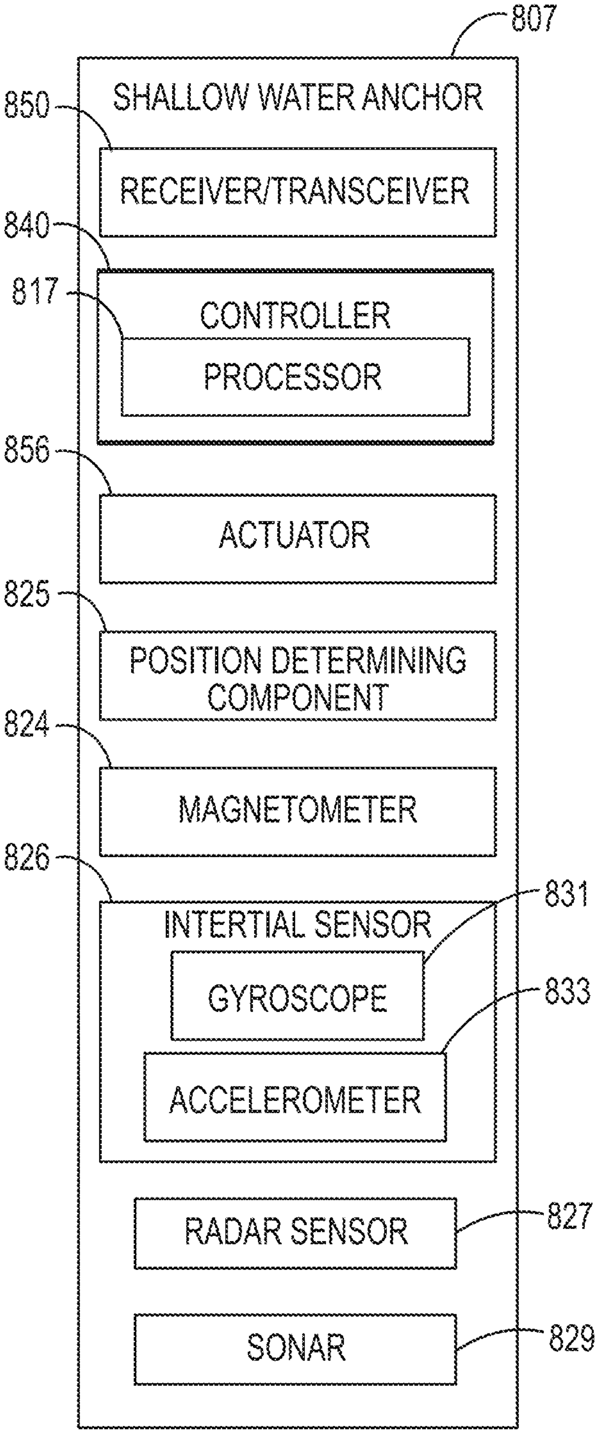
FIG. 8B is a block diagram illustrating components of a shallow water anchor.

FIGS. 8A and 8B are block diagrams illustrating components of a shallow water anchor 807. As shown in FIGS. 8A and 8B, a shallow water anchor 807 can include components and/or circuitry for communicating with the marine vessel control system (e.g., marine vessel control system 615 in FIGS. 6A-6D), a motor (e.g., motor 711 in FIGS. 7A-7B), and/or sensors. The shallow water anchor 807 may include or may be coupled to a receiver/transceiver 850. In some embodiments, the shallow water anchor 807 can include or be coupled to a transmitter. The receiver/transceiver 850 and/or the transmitter can be configured to receive control signals and/or other communications from a marine vessel control system. For example, the receiver/transceiver 850 can be communicatively coupled to the marine vessel control system via a wired or wireless connection.

The shallow water anchor 807 may also include or may be coupled to a controller 840. Controller 840 can correspond to controller 640 in FIG. 6D and may include components and/or circuitry as described above with regard to controller 616 and/or controller 640. For example, controller 840 can include processor 817, which can correspond to processor 617 in FIGS. 6A-6D. The processor 817 can be configured to control an actuator 856 (e.g., motor) that actuates the shallow water anchor 807. In various embodiments, the processor 817 can be configured to lift or deploy the shallow water anchor 807 based on control signals received from the marine vessel control system. In some embodiments, the processor 817 itself is configured to generate the control signals or a portion thereof based on communication data (e.g., measurements, user inputs, sensor data, etc.) received from the marine vessel control system, the motor, and/or sensors.

The shallow water anchor 807 may also include one or more sensors including a position determining component 825, a magnetometer 824, an inertial sensor 826, a radar sensor 827, and/or a sonar 829, as illustrated in FIG. 8B. The inertial sensor 826 can include and/or be coupled to a gyroscope 831 and/or an accelerometer 833. The position determining component 825, magnetometer 824, inertial sensor 826, gyroscope 831, accelerometer 833, radar sensor 827, and/or sonar 829 can correspond to position determining component 625, magnetometer 624, inertial sensor 626, gyroscope 631, accelerometer 633, radar sensor 627, and/or sonar 629 in FIG. 6A, respectively. The processor 817 can be configured to generate control signals at least partially based on sensor data collected by the one or more sensors and/or can be configured to communicate the sensor data to the marine vessel control system and/or the motor.

FIGS. 9A and 9B are block diagrams of a marine vessel display system 905 and a marine vessel control system 915. The marine vessel display system 905 can correspond to marine vessel display system 105 in FIG. 1 and marine vessel control system 915 can correspond to marine vessel control system 615 in FIGS. 6A-6D. The marine vessel control system 915 can be configured to communicate with the marine vessel display system 905. For example, the marine vessel control system 915 can be communicatively coupled (e.g., wired or wirelessly connected) to the marine vessel display system 905, as illustrated in FIG. 9A, or included within the marine vessel display system 905 (e.g., as a component of the marine vessel display system 905), as illustrated in FIG. 9B. The marine vessel display system 905 may be mounted in a marine vessel (e.g., marine vessel 400 in FIGS. 4A and 4B). The marine vessel display system 905 may assist operators of the marine vessel in monitoring information related to the operation of the marine vessel.

As shown in FIGS. 9A and 9B, the marine vessel display system 905 can include at least one input 964 for receiving data from one or more input devices 962, a display 901 for presenting information representative of at least some of the data from the input devices 962, and a processor 917 in communication with the input 964 and the display 901.

As described in more detail below, the processor 917, which can correspond to processor 617 in FIGS. 6A-6D, processor 717 in FIGS. 7A and 7B, and/or processor 817 in FIGS. 8A and 8B, may implement a plurality of modes of operation. Each operation can cause the display 901 to present information representative of data from predetermined ones of the input devices 962 and in selected formats.

The marine vessel display system 905 may further comprise a number of sensors 972, including a position determining component (e.g., position determining component 825 in FIG. 8B) that furnishes geographic position data for the marine vessel.

The processor 917 may implement a mode selector 968 configured to select between a plurality of modes of operation, respective ones of which present information representative of data from input devices 962 on the display 901. The processor 917 may further be configured to cause at least one of automatic activation or deactivation of output devices 970 (e.g., equipment) of the marine vessel (e.g., turn on a fish finder, start a motor, deploy a shallow water anchor, start or shut down the engines of the marine vessel, activate a navigation system, etc.) during selection of a particular mode of operation. In at least one embodiment, the processor 917 is coupled to and/or includes the marine vessel control system 915 that is configured to control the motor and/or shallow water anchor of the marine vessel, which can be output devices 970.

The input 964 may be any wireless or wired device or devices for receiving data from the input devices 962 and transferring the data to the processor 917. The input 964 may comprise, for example, one or more Ethernet ports, Universal Serial Bus (USB) Ports, High Definition Multi-Media Interface (HDMI) ports, memory card slots, video ports, radio frequency (RF) receivers, infrared (IR) receivers, Wi-Fi receivers, Bluetooth devices, and so forth.

The input devices 962 can include, but are not limited to, a throttle, a foot controller, a handheld remote, a multi-function display, and/or a chartplotter communicatively coupled to the marine vessel control system 915. The input devices 962 are configured to receive and/or transmit user commands.

The sensors 972 may provide sensor data to the processor 917 and may comprise any measurement devices, sensors, receivers, or other components that sense, measure, or otherwise monitor components of the marine vessel or its surroundings. For example, the sensors 972 can measure or sense vessel fuel level, wind speed, wind direction, vessel temperature, ambient temperature, water current speed, rudder position, an azimuth thruster position, water depth, boat water storage level, anchor status, boat speed, combinations thereof, and the like. In at least one embodiment, a sensor 972 can be an integrated or external sonar sounder including a sonar transducer. In some embodiments, the sensor 972 can be an integrated or external radar scanner or other proximity sensor.

The sensors 972 may also include transmitters, receivers, transceivers, and other devices that receive data from external sources. For example, the sensors 972 may include an integrated or external weather receiver for receiving weather data from a weather source, a satellite entertainment system receiver for receiving entertainment content broadcast via satellite, and/or a global positioning system (GPS) receiver or other satellite navigation receiver for receiving navigation signals.

The sensors 972 may also comprise a receiver or other device for communicating with transmitters or other devices worn by crew and/or passengers (hereinafter "wearable transmitter") on the marine vessel. For example, crew and passengers of the marine vessel may be provided with a wearable transmitter configured to warn of "man overboard" emergencies. Such a wearable transmitter may detect when the wearer is no longer on the marine vessel, for example, by sensing the presence of water or by comparing the current geographic position of the wearer to the current geographic position of the marine vessel, and may thereafter provide a transmission to cause the marine vessel display system 905, the motor, and/or the shallow water anchor to enter a man overboard mode of operation and to aid in the recovery of the wearer (e.g., by providing the GPS position of the wearer, providing a locating beacon, stopping a motor, repositioning the marine vessel, deploying the shallow water anchor, or the like).

Similarly, crew and passengers of the marine vessel may be provided with a wearable transmitter that is configured to provide a transmission when the wearable transmitter, or an associated medical monitoring device, detects that the wearer is experiencing a medical emergency or health issue. The transmission may cause the marine vessel display system 905 to initiate an automated communication requesting assistance (e.g., an S.O.S. radio transmission), initiate an autopilot mode of operation, or the like.

Still further, crew and passengers of the marine vessel may be provided with a wearable transmitter that is configured to provide radio communication between the wearer and an operator of the marine vessel display system 905. In embodiments, a wearable transmitter may be provided that is capable of furnishing multiple functions such as those described herein above.

The sensors 972 may also comprise a security system for monitoring, ports, doors, windows, and other parts of the marine vessel against unauthorized access and one or more cameras for providing video and/or other images of the marine vessel and/or surroundings of the marine vessel.

The sensors 972 may comprise and/or be included in one or more computers (e.g., marine vessel control system 915) that may be used to transfer data to the marine vessel display system 905. The sensors 972 may be integrally formed with the marine vessel display system 905, may be stand-alone devices, or may be a combination of both. For example, a sonar sounder may be integrated into the marine vessel display system 905 or may be an external sonar sounder module. Similarly, a radar scanner may be integrated into the marine vessel display system 905 or be an external device. The sensors 972 may be operated and/or adjusted by the input devices 962, the marine vessel display system 905, and/or the marine vessel control system 915.

The display 901 may be communicatively coupled with the processor 917 and may be configured for displaying text, data, graphics, images, and/or other information representative of data and/or commands from the sensors 972, input devices 962, marine vessel control system 915, and/or other sources. An example embodiment of the display 901 is shown in FIG. 2. The processor 917 may control the presentation of information on the display 901, may perform other functions described herein, and can be implemented in hardware, software, firmware, or a combination thereof.

The processor 917 may include any number of processors, controllers, microprocessors, microcontrollers, programmable logic controllers (PLCs), field-programmable gate arrays (FPGAs), application specific integrated circuits (ASICs), or any other component or components that are operable to perform, or assist in the performance of, the operations described herein. The processor 917 may also be communicatively coupled to or include memory 918 for storing instructions or data. Memory 918 can correspond to memory 618 in FIGS. 6A-6D.

The memory 918 may store one or more databases that may include information about the marine vessel in which the marine vessel display system 905 is used, such as the length, width, weight, turning radius, top speed, draft, minimum depth clearance, minimum height clearance, water capacity, fuel capacity, and/or fuel consumption rate of the marine vessel. The databases may also store information related to the locations and types of navigational aids including buoys, markers, lights, or the like. In some embodiments, the information related to navigational aids may be provided by the Coast Guard or other map data sources.

The processor 917 may implement one or more computer programs that provide the modes of operation described below, that control the display of information on the display 901 as described herein, and/or that cause automatic activation or deactivation of the output devices 970 of the marine vessel during selection of a mode of operation. The computer programs may comprise ordered listings of executable instructions for implementing logical functions in the processor 917. The computer programs can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions.

In the context of this application, a "computer-readable medium" can be any non-transitory means that can contain, store, communicate, propagate, or transport the program for use by or in connection with the processor 917 or other instruction execution system, apparatus, or device. The computer-readable medium can be, for example, but not limited to, an electronic, magnetic, optical, electro-magnetic, infrared, or semi-conductor system, apparatus, device, or propagation medium. More specifically, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

In accordance with the present disclosure, the processor 917 may implement a plurality of modes of operation, each of which may present information representative of data and/or commands from sensors 972 and/or input devices 962 via the display 901. In some embodiments, the information may be presented in a desired format to minimize confusion and increase ease of use. For example, the processor 917 may implement a pre-trip planning mode in which information representative of trip planning data is presented on the display 901. The trip planning data may be uploaded, transmitted, or otherwise communicated to the marine vessel display system 905 from sensors 972 and/or input devices 962 and may include route planning data, waypoint data, journey plans, forecasted wind, current, storm, and/or tidal conditions, vessel fuel requirements, vessel water requirements, and/or other data that may be useful to an operator while planning a journey. The pre-trip planning mode may permit an operator to create a journey plan or similar plan on a remote or local computer and then transfer information related to the plan to the marine vessel display system 905 so it can be presented on the display 901 and accessed by the operator while operating the marine vessel.

In some embodiments, the user may plan a route from a location to a destination utilizing display system 905 and cartographic data (including, for instance, contour and depth information) stored therein. The display system 905 can present information regarding the planned routes and its associated legs, such as recommendations or indications as to what type of motor and/or anchor will be utilized for each leg, waypoint, and/or destination of the route. The user can utilize the display system 905 to change or otherwise control the suggestions by the display system 905, such as to indicate that the trolling motor should be deployed for one segment of the route while the shallow water anchor should be deployed for a particular waypoint or destination. Similarly, the user can use the display system 905 to plan and control pivot maneuvers or other complex movements requiring the use of both a motor and a shallow water anchor. Thus, in advance of reaching the destination or even beginning navigation along the route, the user can plan and understand how the various motor(s) and/or anchor(s) will be used and selected by the control system along the route.

The processor 917 may also implement a docking/undocking mode in which information representative of proximity data from a proximity sensor, wind data from a wind sensor, water current data from a current sensor, rudder position data from a rudder position sensor, and/or azimuth thruster position data from an azimuth thruster position sensor is presented on the display 901. The docking/undocking mode permits an operator to view representations of obstacles such as stationary boats, docks, and other hazards while simultaneously monitoring wind conditions, current conditions, and the status of components on the vessel while docking or undocking the marine vessel. In a number of embodiments, the docking/undocking mode may activate, deactivate, and/or actuate a motor and/or actuate a shallow water anchor to reposition or maintain a position of the marine vessel.

The processor 917 may also implement a main transit mode in which information representative of fuel level data, navigation data, water depth data, and/or weather data is presented on the display 901. A feature of the main transit mode may be monitoring the progress of the marine vessel against a journey plan. For example, the processor 917 may compare information related to a desired path of transit with the current position of the marine vessel received from one or more of the sensors 972 while the marine vessel is in transit to determine if the marine vessel is off course, has enough fuel to reach its intended destination, and so forth, and may then display such information on the display 901. The main transit mode may also present information representative of nearby vessels, obstacles, and so forth. In some examples, the main transit mode may activate, deactivate, and/or actuate a motor and/or actuate a shallow water anchor to course correct and/or reduce fuel consumption.

The processor 917 may also implement an anchoring mode in which information representative of the anchor status data, wind data, depth data, tide data, proximity data, and/or navigation is presented on the display 901. The anchoring mode may permit an operator to find suitable locations to anchor the marine vessel, and alert the operator if the anchor is dragging and/or if the marine vessel is moving when it should not be. In a number of embodiments, the anchoring mode may activate, deactivate, and/or actuate a motor and/or actuate a shallow water anchor to reposition or maintain a position of the marine vessel.

The processor 917 may also implement a fishing mode in which information representative of fish finder data, water temperature data, navigation data, and/or proximity data is presented on the display 901. The fishing mode may allow an operator to view representations of fish, other boats, and hazards while fishing and to monitor water conditions to determine if they are conducive to fishing. In a number of embodiments, the fishing mode may activate, deactivate, and/or actuate a motor and/or actuate a shallow water anchor to reposition or maintain a position of the marine vessel based on whether the current position is conducive to fishing. For example, the processor 917 may utilize sonar data to automatically identify nearby fish species and then select which one (or both) of the shallow water anchor and the trolling motor to deploy. For example, the operator can input a desired fish species, such as largemouth bass, to the processor 917 to cause the processor 917 to anchor the vessel when a threshold number of bass are detected nearby.

Additionally or alternatively, the processor 917 may implement an unsticking mode to assist in freeing the shallow water anchor in the event it becomes lodged in the bottom of the body of water, in underwater structure, in aquatic vegetation, or the like. The unsticking mode can be manually triggered by the operator and/or automatically engaged by the processor 917 when it determines that the shallow water anchor is deployed in an area where sticking is likely (e.g., that the anchor is deployed in sticky mud, gravel, sand, etc., identified by sonar data provided by the sonar system).

The processor 917 may additionally or alternatively use one or more sensors associated with the anchor, such as deployment or position sensors capable of detecting the extent to which the anchor has been moved, to determine when the anchor has not been retracted/stowed as commanded. Upon entering unsticking mode, the processor 917 may control the anchor to unstick it, such as by cycling the anchor rapidly up and down, increasing power to the motor, etc. In some examples, the processor 917 may utilize motors associated with the vessel, including the trolling motor(s) discussed above, to assist in unsticking the anchor. For example, the processor 917 can control the trolling motor(s) to gently rock the vessel forward and aft, or side to side, while the processor 917 attempts to retract the anchor.

The above-described modes of operation are only examples of modes that may be implemented by the processor 917. Other modes of operation, or combinations or portions of the above-described modes, may also be implemented without departing from the scope of the disclosure.

In addition to displaying information from the sensors 972 and/or input devices 962, each mode of operation may present information in a particular operator-selected or otherwise predetermined format. For example, some of the information may be presented in the form of one or more virtual devices that mimic the appearance and/or function of a gauge, instrument, or other analog device. Each virtual device may have a unique collection of graphical and functional properties that may be configured by a layout designer and/or adjusted by an operator. Examples of virtual devices that may be presented with the marine vessel display system 905 include a chartplotter, a radar screen, a fish-finder, a camera/video screen, digital instruments with numbers, analog instrument gauges, autopilot interfaces, and entertainment interfaces.

In some embodiments, the display format may change based on a current operating mode. For example, if the selected mode of operation changes, the display format may change accordingly to accommodate features relevant to the selected mode of operation.

The processor 917 may further be configured to cause automatic activation or deactivation of the output devices 970 of the marine vessel during selection of particular modes of operation. In embodiments, output devices 970 of the marine vessel for which use may be expected or possible during the time a mode of operation is selected may be associated with that mode of operation. The processor 917 may then automatically activate such output devices 970 when the mode of operation is selected. Similarly, the processor 917 may automatically deactivate other output devices 970 that are no longer expected to be used while the mode of operation is selected. For example, when a fishing mode is selected, the processor 917 may issue a command to shut down or idle the marine vessel's engine, start a trolling motor, and/or turn on a fish finder.

In embodiments, the processor 917 may be configured to cause the automatic activation or deactivation of one or more output devices 970 via an output 966 when a particular mode of operation is selected. The output 966 may be any wired or wireless port, transceiver, memory slot, or other device for transferring data commands, and/or other information from the processor 917 to the output devices 970.

The marine vessel display system 905 may also include a speaker for providing audible instructions and feedback, a microphone for receiving voice commands, an infrared port for wirelessly receiving and transmitting data and other information from and to nearby electronics, and other information, and a cellular or other radio transceiver for wirelessly receiving and transmitting data from and to remote devices.

In addition to the input 964 and output 966, the marine vessel display system 905 may also include a number of other Input/Output (I/O) ports that permit data and other information to be communicated to and from the processor 917. The I/O ports may include one or more removable memory card slots, such as a micro SD card slot, or the like for receiving removable memory cards, such as microSD cards, or the like, and/or an Ethernet port for coupling a processor 917 to another processing system such as a personal computer.

Databases of geographic areas cross-referenced with modes of operation, navigational software, cartographic maps and other data and information may be loaded in the marine vessel display system 905 via the I/O ports, the wireless transceivers, or the infrared port mentioned above. The data may be stored in memory 918 of processor 917. In some embodiments, stored cartographic maps may be upgraded, downgraded, or otherwise modified in the background without interfering with the primary uses of the marine vessel display system 905. If multiple processors 917 are employed by the marine vessel display system 905, the upgrade, downgrade, or modification may be applied to all processors 917. Thus, for example, the various components of the marine vessel display system 905 may be easily upgraded, downgraded, or modified without manually and tediously installing the same data on each of the components. Such functionality may also facilitate data uniformity among the various components of the marine vessel display system 905.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

As used herein, "a number of" something can refer to one or more of such things. As will be appreciated, elements shown in the various embodiments herein can be added, exchanged, and/or eliminated so as to provide a number of additional embodiments of the present disclosure.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A marine vessel control system operable to be used with a shallow water anchor, the shallow water anchor including a deployable spear to anchor the marine vessel, the marine vessel control system comprising:

a memory; and a processor coupled to the memory, wherein the processor is configured to:

receive sonar data;

determine a water depth relative to a water bottom based on the sonar data; and transmit a first command that causes the shallow water anchor to deploy when the water depth is less than a threshold water depth, wherein the threshold water depth corresponds to a maximum depth at which the shallow water anchor's deployable spear is fully extended and penetrates the water bottom, wherein the processor is further configured to transmit a second command that causes the shallow water anchor's deployable spear to raise in response to receiving a throttle input while the shallow water anchor's deployable spear is deployed.

2. The marine vessel control system of claim 1, wherein the first command causes the shallow water anchor's deployable spear to deploy based on the determined water depth.

3. The marine vessel control system of claim 1, wherein the processor is integrated with the shallow water anchor.

4. The marine vessel control system of claim 1, further including a display in communication with the processor, wherein the processor is further configured to cause the display to present information regarding a status of the shallow water anchor.

5. The marine vessel control system of claim 1, wherein the processor is configured to receive data from at least one sensor selected from the group consisting of a global navigation satellite system (GNSS) receiver, a magnetometer, an accelerometer, a sonar system, a gyroscope, and a radar sensor.

6. The marine vessel control system of claim 5, wherein the processor is further configured to:

determine a characteristic of the water swell using the data received from the at least one sensor; and transmit a third command that causes the shallow water anchor's deployable spear to raise or lower based on the determined characteristic of the water swell, wherein raising or lowering the shallow water anchor's deployable spear based on the determined characteristic of the water swell causes the shallow water anchor's spear to stay in contact with the water bottom.

7. A marine vessel control system operable to be used with a shallow water anchor and a trolling motor, the shallow water anchor including a deployable spear to anchor the marine vessel, the marine vessel control system comprising:

a memory; and a processor coupled to the memory, wherein the processor is configured to:

receive a desired position of a marine vessel;

receive sonar data;

based on the sonar data and the desired position of the marine vessel, determine a composition of a water bottom; and select between the shallow water anchor and the trolling motor based at least in part on the composition of the water bottom, wherein when the shallow water anchor is selected, the processor is further configured to transmit a first command that causes the shallow water anchor's deployable spear to lower until the spear penetrates the water bottom, wherein when the trolling motor is selected, the processor is further configured to transmit a second command that causes the motor to maintain the marine vessel at the desired position.

8. The marine vessel control system of claim 7, wherein the processor is configured to:

receive data from a global navigation satellite system (GNSS) receiver; and determine a speed and direction of drift of the marine vessel based on the data.

9. The marine vessel control system of claim 8, wherein the processor is configured to transmit the first command to the shallow water anchor that causes the shallow water anchor's deployable spear to lower and the second command to the motor that causes the motor to counteract the determined speed and direction of drift.

10. The marine vessel control system of claim 9, wherein the second command to the motor causes the motor to provide propulsion in a direction opposite to the direction of the drift.

11. The marine vessel control system of claim 7, wherein the desired position of the marine vessel comprises one of a number of waypoints.

12. The marine vessel control system of claim 7, further including a display in communication with the processor, wherein the processor is further configured to cause the display to present information regarding a status of the shallow water anchor.

* * * * *